US008233998B2

(12) United States Patent
Wysuph et al.

(10) Patent No.: US 8,233,998 B2
(45) Date of Patent: Jul. 31, 2012

(54) SECURE DATA WRITE APPARATUS AND METHODS FOR USE IN SAFETY INSTRUMENTED PROCESS CONTROL SYSTEMS

(75) Inventors: Alan Joe Wysuph, Round Rock, TX (US); Michael George Ott, Austin, TX (US); Bruce Hubert Campney, Pflugerville, TX (US); Cindy Alsup Scott, Georgetown, TX (US); Michael Wayne Ausen, Round Rock, TX (US); Gary Keith Law, Georgetown, TX (US); Godfrey Roland Sherriff, Austin, TX (US); David Mark Smith, Round Rock, TX (US); Julian Kevin Naidoo, Cedar Park, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 269 days.

(21) Appl. No.: 10/993,072

(22) Filed: Nov. 19, 2004

(65) Prior Publication Data
US 2006/0111794 A1 May 25, 2006

(51) Int. Cl.
*G05B 11/01* (2006.01)
(52) U.S. Cl. ............... 700/19; 700/11; 700/20; 700/65; 700/66; 700/79; 379/106.01
(58) Field of Classification Search .................... 700/19, 700/20, 65, 66, 11, 79; 379/106.01
See application file for complete search history.

(56) References Cited

U.S. PATENT DOCUMENTS

| 4,133,504 | A | 1/1979 | Dobler et al. |
| 6,091,711 | A | 7/2000 | Fukuda |
| 6,647,301 | B1 * | 11/2003 | Sederlund et al. ............ 700/79 |
| 2002/0080938 | A1 * | 6/2002 | Alexander et al. ....... 379/106.01 |
| 2003/0209599 | A1 * | 11/2003 | Gatto ........................... 235/379 |

FOREIGN PATENT DOCUMENTS

| GB | 1554771 | | 6/1976 |
| GB | 2377070 A | * | 12/2002 |
| JP | 59-200365 | | 11/1984 |
| JP | 59200365 A | * | 11/1984 |

(Continued)

OTHER PUBLICATIONS

The Patent Office, U.K. Search Report, Jan. 30, 2006, 4 Pages.

(Continued)

*Primary Examiner* — Kakali Chaki
*Assistant Examiner* — Tejal Gami
(74) *Attorney, Agent, or Firm* — Hanley, Flight & Zimmerman, LLC.

(57) ABSTRACT

Secure data write apparatus and methods for use in safety instrumented process control systems select a parameter associated with a process control element within the process control system and send first data associated with the parameter to the process control element. A confirmation associated with a request to write the first data to the process control element is received from a user and the second data is sent to the process control element in response to receiving the confirmation. The first and second data are compared at the process control element and the first or second data are written to a location in the process control element associated with the parameter if the first and second data are at least substantially identical.

46 Claims, 18 Drawing Sheets

FOREIGN PATENT DOCUMENTS

| | | |
|---|---|---|
| JP | 60-198645 | 10/1985 |
| JP | 60198645 A * | 10/1985 |
| JP | 10 326172 | 12/1998 |

OTHER PUBLICATIONS

UK Intellectual Property Office, UK Examination Report dated Feb. 22, 2008, in connection with counterpart British application No. GB0523453.9 (2 Pages).

UK Intellectual Property Office, UK Search and Examination Report dated Sep. 25, 2008, in connection with counterpart British application No. GB0811727.7 (5 pages).

Official Action dated Dec. 19, 2008, in Chinese Application No. 200510123697.2 (8 pages).

Chinese Intellectual Property Office issued on Jan. 8, 2010, Text of the Second Office Action (English Translation) in Chinese patent application No. 200510123697.2, 12 pages.

State Intellectual Property Office of P.R. China; Office Action issued for corresponding International Patent Application No. 200510123697.2 on Feb. 28, 2011.

Emerson Process Management, "A New World of Safety," May 2004, 16 pages.

Emerson Process Management, Safety Instrumented Systems, Jan. 2004, 32 pages.

Mostia, Bill Jr., Putman Media, "The Safety Instrumented Function: an S-Word Worth Knowing," Aug. 2003, 4 pages.

Emerson Process Management, *A New World of Safety*, 18 pages, May 2004.

Mostia, Bill Jr., PutmanMedia, *The Safety Instrumented Function: an S-Word Worth Knowing*, Aug. 2003, 4 pages.

Japanese Patent Office, Office Action, for corresponding patent application No. 2005-336143, issued on May 24, 2011, 5 pages.

State Intellectual Property Office of P.R. China, Office Action, issued for Chinese Patent Application Serial No. 200510123697.2, on Sep. 7, 2011, (6 pages).

* cited by examiner

SECURE DATA WRITE APPARATUS AND METHODS FOR USE IN SAFETY INSTRUMENTED PROCESS CONTROL SYSTEMS

FIELD OF THE DISCLOSURE

The present invention relates generally to process control systems and, more specifically, to secure data write apparatus and methods for use in safety instrumented process control systems.

BACKGROUND

Process control systems, like those used in chemical, petroleum or other processes, typically include one or more centralized process controllers communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine and then generates control signals that are sent over the buses or other communication lines to the field devices to control the operation of the process. Information from the field devices and the controllers may be made available to one or more applications executed by the operator workstation to enable an operator to perform desired functions with respect to the process, such as viewing the current state of the process, modifying the operation of the process, etc.

Many process control systems also include one or more application stations. Typically, these application stations are implemented using a personal computer, workstation, or the like that is communicatively coupled to the controllers, operator workstations, and other systems within the process control system via a local area network (LAN). Each application station may execute one or more software applications that perform campaign management functions, maintenance management functions, virtual control functions, diagnostic functions, real-time monitoring functions, safety-related functions, configuration functions, etc. within the process control system.

Some process control systems or portions thereof may present significant safety risks. For example, chemical processing plants, power plants, etc. may implement critical processes that, if not properly controlled and/or shut down rapidly using a predetermined shut down sequence, could result in significant damage to people, the environment, and/or equipment. To address the safety risks associated with process control systems having such critical processes, many process control system providers offer products compliant with safety-related standards such as, for example, the International Electrotechnical Commission (IEC) 61508 standard and the IEC 61511 standard.

In general, process control systems that are compliant with one or more known safety-related standards are implemented using a safety instrumented system architecture in which the controllers and field devices associated with the basic process control system, which is responsible for the continuous control of the overall process, are physically and logically separate from special purpose field devices and other special purpose control elements associated with the safety instrumented system, which is responsible for the performance of safety instrumented functions to ensure the safe shutdown of the process in response to control conditions that present a significant safety risk. In particular, compliance with many known safety-related standards requires a basic process control system to be supplemented with special purpose control elements such as logic solvers, safety certified field devices (e.g., sensors, final control elements such as, for example, pneumatically actuated valves), and safety certified software or code (e.g., certified applications, function modules, function blocks, etc.)

One particularly important aspect of safety instrumented process control systems involves the integrity of information or data communicated among the process control devices (e.g., controllers, logic solvers, workstations, etc.) within the systems. Specifically, any failed or corrupt messages (and data write operations associated therewith) such as commands containing safety-related information and/or other data transmitted to a controller, user requested parameter value changes associated with safety instrumented functions, etc. can potentially compromise the safety of the entire process control system. While known safety-related hardware and/or software used with process control systems often provides redundant communication links, data error checking mechanisms such as known cyclical redundancy checks, etc., many known process control systems do not adequately address the problems associated with failed or corrupt messages or data write operations.

In addition to safety-related data transmission apparatus and methods (e.g., redundancy links, cyclical redundancy checks, etc.), many known process control systems also provide at least one graphical run-time interface that allows a user or other system operator to monitor processes, change parameter values, issue commands, etc. to one or more devices, control loops, and/or other process control entities. Further, these known process control systems may also provide graphical configuration and/or diagnostic interfaces that enable a user or operator to define and configure various aspects of the run-time graphical interface, to debug or diagnose various problems associated with the operation of the process control system, etc. For example, users may interact with a configuration graphical interface to associate certain dialogs, encoded scripts (i.e., machine readable and/or executable encoding), with graphical run-time objects (e.g., function modules, equipment graphics, parameter values, etc.) In this manner, during run-time, a user may invoke such previously configured graphical objects (e.g., by using a mouse or other pointing device to select the objects) to cause execution of the underlying scripts or code. However, creation of such graphical objects, dialogs, and executable scripts is a time consuming and tedious process, particularly for process control systems having a large number of safety-related process control components, sub-systems, devices, etc. Further, making changes to the graphical dialogs and scripts once created is also a time consuming and error prone process. Dialog and script errors are particularly problematic in the case of safety instrumented functions that must be implemented in a consistent manner so that, for example, the underlying scripts, code, etc. perform data write operations in a manner that complies with a safety certified procedure, standard, or the like.

SUMMARY

In one example, a method and apparatus for writing data in a process control system selects a parameter associated with a process control element within the process control system and sends first data associated with the parameter to the process control element. The example method and apparatus receives from a user a confirmation associated with a request to write the first data to the process control element, sends second data to the process control element in response to receiving the confirmation, and compares the first and second data at the process control element. The example method and apparatus writes the first or second data to a location in the process control element associated with the parameter if the first and second data are at least substantially identical.

In another example, a secure write server includes a memory and a processor coupled to the memory. The processor is configured to send a secure write request to a controller in response to an application calling a secure write method. In addition, the secure write server receives a confirmation input from a user via the application and sends a secure write confirm request to the controller in response to receiving the confirmation input.

In yet another example, a system and method for automatically generating a script for use in writing data in a process control system receives a user selection associated with a parameter of a process control element, provides the user a graphical configuration interface associated with the parameter, and receives user input associated with the parameter via the graphical configuration interface. The example system and method automatically generates a script based on the user input that, when executed, generates a graphical dialog to perform a secure data write to the process control element.

DETAILED DESCRIPTION

Figure 1:
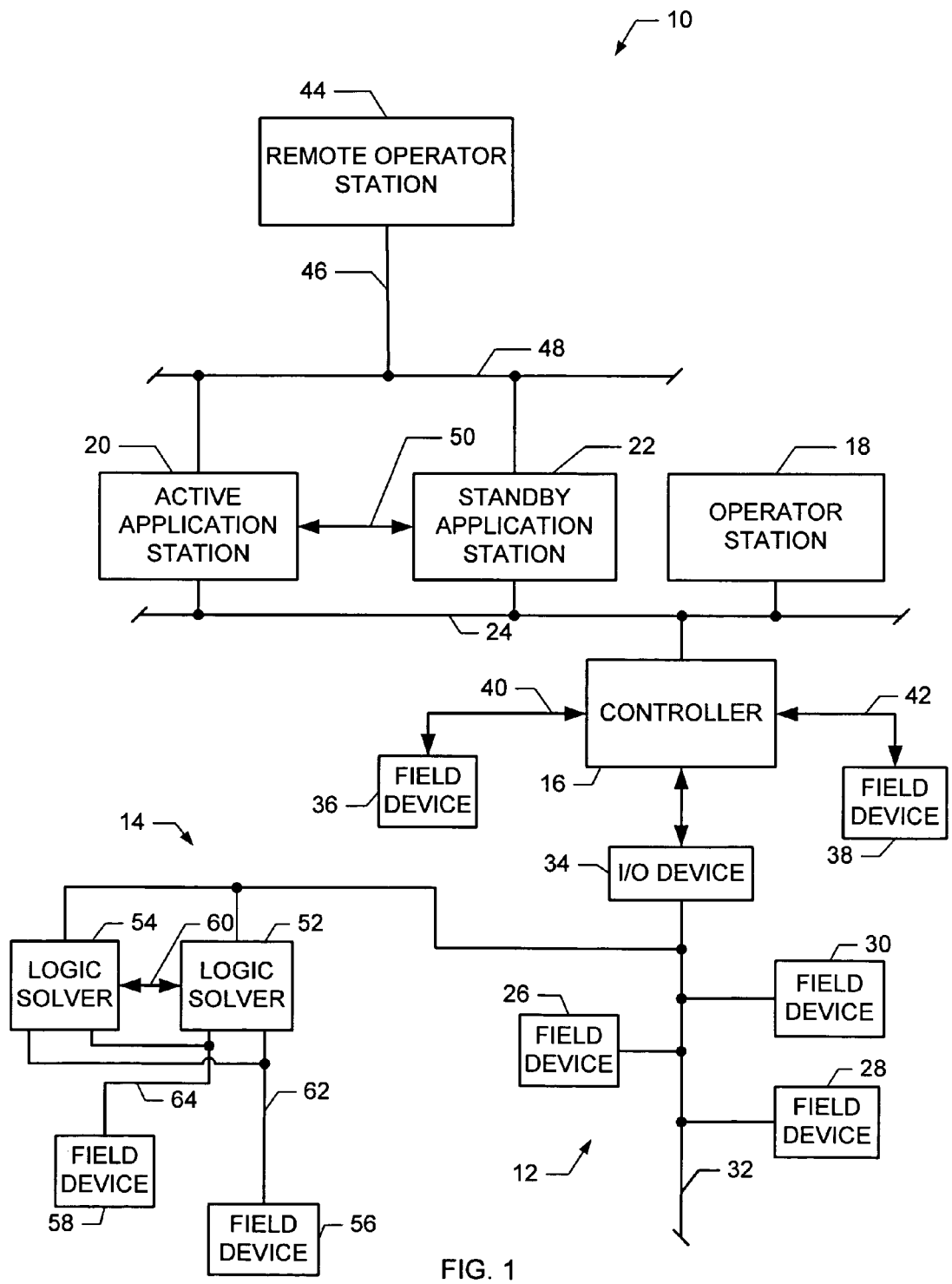
FIG. 1 is a block diagram of an example process control system that uses the secure data write apparatus and methods described herein.

In general, the example apparatus and methods described herein may be used within a process control system to facilitate the automatic creation and editing of graphical objects and/or scripts associated with graphical objects that may be used to convey process control messages to safety-related hardware and/or software within a safety instrumented process control system. More specifically, the example methods and apparatus described herein enable a system operator or user to select graphical objects associated with equipment, devices, function modules, function blocks, and/or any other hardware and/or software process control elements within a process control system and associate graphical dialogs and executable scripts (e.g., machine accessible and/or executable instructions, code or software) with those elements. The graphical dialogs and executable scripts are configured to enforce secure data writing protocol(s) in connection with commands, parameter value changes, and/or other user-initiated messages sent to those selected elements.

In some examples, a system operator or user may instantiate a graphical configuration-related view of a process control system, or a portion thereof, and may select a graphical object representative of a function module, function block, device, equipment, or parameter. The example apparatus and methods may then be used to create a graphical dialog with which, as described in greater detail below, the system user or operator may subsequently interact via a run-time application, diagnostic application, etc. to send messages (e.g., commands, parameter values, etc.) in a secure manner (e.g., in a manner that complies with a safety-related standard or certification and which substantially minimizes or eliminates the likelihood of message corruption, failed message delivery, and/or spurious messages) to safety instrumented hardware and/or software within the process control system. The graphical dialogs may be composed of one or more graphic windows, each of which may include user selectable graphic buttons or labels, descriptive textual or graphical information pertaining to, for example, a parameter value and/or command that a user may wish to send to a safety instrumented portion of the process control system, entry areas or fields into which a user may input textual and/or numerical information associated with a message or data to be sent, etc.

The example graphical dialogs overlay or are associated with machine accessible or readable scripts, instructions, or code that, when executed upon invocation of a selected graphical object and/or via interaction with the graphical dialog(s), cause one or more process control messages to be securely conveyed to a safety instrumented or otherwise safety-related portion of a process control system. More specifically, the scripts, instructions, or code underlying the graphical dialogs may be configured to interact with example secure data write apparatus and methods that execute and enforce a secure data write protocol or technique to substantially ensure that messages are sent by users having appropriate authority or permission(s), to substantially eliminate the possibility of spurious messages from affecting parameter value changes and/or causing the execution of commands, and to substantially ensure that messages, which may include parameter value data and/or command data, received by the target safety instrumented entity (e.g., a safety instrumented software component, a safety instrumented hardware component, etc.) are not corrupt or otherwise unsafe. More generally, the example secure data write apparatus and methods enable information or data to be conveyed among the devices within a safety instrumented process control system in a manner that ensures compliance with one or more safety-related standard(s).

As described in greater detail below, an example secure data write protocol, technique, or method may send redundant messages to a logic solver configured to perform safety-related and/or certified process control operations or safety instrumented functions. In particular, the example secure data write method may sequentially send multiple data write requests, each of which contains the same message or content (e.g., parameter value information or data, command information or data, etc.) Thus, the multiple data write requests are redundant because they include the same or identical content or at least substantially identical content. Each of the multiple or redundant data write requests may take the form an encapsulated data packet formatted or compliant with any desired packetization scheme, communication protocol, etc. In addition, each of the encapsulated data packets, which contain the data write request information, may include a cyclical redundancy check value and/or any other desired error checking value.

The logic solver and the software executed thereby may be configured to use the packet error checking values to test the integrity of the individual data packets received. Additionally, the logic solver may be further configured to extract the parameter value information, command information, or other data sent within the data packets and to compare the extracted information. If the individual data packets are determined to be intact via the CRCs, for example, and/or if the content of the packets (e.g., the parameter value information, command information, etc.) matches (e.g., is identical or at least substantially identical), then the logic solver and the software executed thereby may act on the packet content by, for example, executing a command, changing a parameter value, or taking any other appropriate action.

FIG. 1 is a block diagram of an example process control system 10 that uses the example secure data write apparatus and methods described herein. As shown in FIG. 1, the process control system 10 includes a basic process control system portion 12 and a safety instrumented portion 14. The basic process control system portion 12 is responsible for continuous performance of a controlled process, whereas the safety instrumented portion 14 is responsible for carrying out a shut down of the controlled process in response to one or more unsafe conditions. As depicted in FIG. 1, the basic process control system portion 12 includes a controller 16, an operator station 18, an active application station 20 and a standby application station 22, all of which may be communicatively coupled via a bus or local area network (LAN) 24, which is commonly referred to as an application control network (ACN). The operator station 18 and the application stations 20 and 22 may be implemented using one or more workstations or any other suitable computer systems or processing units. For example, the application stations 20 and 22 could be implemented using single processor personal computers similar to the example processor system 902 shown in FIG. 9 below, single or multi-processor workstations, etc. In addition, the LAN 24 may be implemented using any desired communication medium and protocol. For example, the LAN 24 may be based on a hardwired or wireless Ethernet communication scheme, which is well known and, thus, is not described in greater detail herein. However, as will be readily appreciated by those having ordinary skill in the art, any other suitable communication medium and protocol could be used. Further, although a single LAN is shown, more than one LAN and appropriate communication hardware within the application stations 20 and 22 may be used to provide redundant communication paths between the operator station 18, the application stations 20 and 22, and the controller 16.

The controller 16 may be coupled to a plurality of smart field devices 26, 28 and 30 via a digital data bus 32 and an input/output (I/O) device 34. The smart field devices 26-30 may be Fieldbus compliant valves, actuators, sensors, etc., in which case the smart field devices 26-30 communicate via the digital data bus 32 using the well-known Fieldbus protocol. Of course, other types of smart field devices and communication protocols could be used instead. For example, the smart field devices 26-30 could instead be Profibus or HART compliant devices that communicate via the data bus 32 using the well-known Profibus and HART communication protocols. Additional I/O devices (similar or identical to the I/O device 34) may be coupled to the controller 16 to enable additional groups of smart field devices, which may be Fieldbus devices, HART devices, etc., to communicate with the controller 16.

In addition to the smart field devices 26-30, one or more non-smart field devices 36 and 38 may be communicatively coupled to the controller 16. The non-smart field devices 36 and 38 may be, for example, conventional 4-20 milliamp (mA) or 0-10 volts direct current (VDC) devices that communicate with the controller 16 via respective hardwired links 40 and 42.

The controller 16 may be, for example, a DeltaV™ controller sold by Fisher-Rosemount Systems, Inc. However, any other controller could be used instead. Further, while only one controller is shown in FIG. 1, additional controllers of any desired type or combination of types could be coupled to the LAN 24. The controller 16 may perform one or more process control routines associated with the process control system 10. Such process control routines may be generated by a system engineer or other system operator using the operator station 18 and downloaded to and instantiated in the controller 16. As described in greater detail below, the controller 16 may also be configured to perform operations associated with the example secure data write apparatus and methods described herein.

As depicted in FIG. 1, the example process control system 10 may also include a remote operator station 44 that is communicatively coupled via a communication link 46 and a LAN 48 to the application stations 20 and 22. The remote operator station 44 may be geographically remotely located, in which case the communication link 46 is preferably, but not necessarily, a wireless communication link, an internet-based or other switched packet-based communication network, telephone lines (e.g., digital subscriber lines), or any combination thereof.

As depicted in the example of FIG. 1, the active application station 20 and the standby application station 22 are communicatively coupled via the LAN 24 and via a redundancy link 50. The redundancy link 50 may be a separate, dedicated (i.e., not shared) communication link between the active application station 20 and the standby application station 22. The redundancy link 50 may be implemented using, for example, a dedicated Ethernet link (e.g., dedicated Ethernet cards in each of the application stations 20 and 22 that are coupled to each other). However, in other examples, the redundancy link 50 could be implemented using the LAN 24 or a redundant LAN (not shown), neither of which is necessarily dedicated, that is communicatively coupled to the application stations 20 and 22.

Generally speaking, the application stations 20 and 22 continuously, by exception or periodically, exchange information (e.g., in response to parameter value changes, application station configuration changes, etc.) via the redundancy link 50 to establish and maintain a redundancy context. The redundancy context enables a seamless or bumpless handoff or switchover of control between the active application station 20 and the standby application station 22. For example, the redundancy context enables a control handoff or switchover from the active application station 20 to the standby application station 22 to be made in response to a hardware or software failure within the active application station 20 or in response to a directive from a system operator or user or a client application of the process control system 10.

As depicted in FIG. 1, the safety instrumented portion 14 of the process control system 10, includes logic solvers 52 and 54 and field devices 56 and 58. The logic solvers 52 and 54 may, for example, be implemented using the commercially available DeltaV SLS 1508 logic solver produced by Fisher-Rosemount Systems, Inc. In general, the logic solvers 52 and 54 cooperate as a redundant pair via a redundancy link 60. However, the redundant logic solvers 52 and 54 could instead be a single non-redundant logic solver or multiple non-redundant logic solvers. Also, generally, the example logic solvers 52 and 54 are safety rated electronic controllers that are configured to implement one or more safety instrumented functions. As is known, a safety instrumented function is responsible for monitoring one or more process conditions associated with a specific hazard or unsafe condition, evaluating the process conditions to determine if a shut down of the process is warranted, and causing one or more final control elements (e.g., shut down valves) to effect a shut down of a process, if warranted.

Typically, each safety instrumented function is implemented using at least one sensing device, one logic solver, and one final control device (e.g., a valve). The logic solver is typically configured to monitor at least one process control parameter via the sensor and, if a hazardous condition is detected, to operate the final control device to effect a safe shut down of the process. For example, a logic solver may be communicatively coupled to a pressure sensor that senses the pressure in a vessel or tank and may be configured to cause a vent valve to open if an unsafe overpressure condition is detected via the pressure sensor. Of course, each logic solver within a safety instrumented system may be responsible for carrying out one or multiple safety instrumented functions and, thus, may be communicatively coupled to multiple sensors and/or final control devices, all of which are typically safety rated or certified.

The field devices 56 and 58 may be smart or non-smart sensors, actuators, and/or any other process control devices that can be used to monitor process conditions and/or effect a controlled shut down of the process control system 10. For example, the field devices 56 and 58 may be safety certified or rated flow sensors, temperature sensors, pressure sensors, shut down valves, venting valves, isolation valves, critical on/off valves, etc. While only two logic solvers and two field devices are depicted in the safety instrumented portion 14 of the example process control system 10 of FIG. 1, additional field devices and/or logic solvers may be used to implement any desired number of safety instrumented functions.

As depicted in FIG. 1, the field devices 56 and 58 are communicatively coupled to the logic solvers 52 and 54 via respective links 62 and 64. In the case where the field devices 56 and 58 are smart devices, the logic solvers 52 and 54 may communicate with the field devices 56 and 58 using a hardwired digital communication protocol (e.g., HART, Fieldbus, etc.) However, any other desired communication media (e.g., hardwired, wireless, etc.) and protocol may be used instead.

As is also shown in FIG. 1, the logic solvers 52 and 54 are communicatively coupled to the controller 16 via the bus 32 and the I/O device 34. However, the logic solvers 52 and 54 could alternatively be communicatively coupled within the system 10 in any other desired manner. For example, the logic solvers 52 and 54 could be coupled directly to the controller 16 and/or via the LAN 24. Regardless of the manner in which the logic solvers 52 and 54 are coupled within the system 10, the logic solvers 52 and 54 are preferably, although not necessarily, logical peers with respect to the controller 16.

Figure 2:
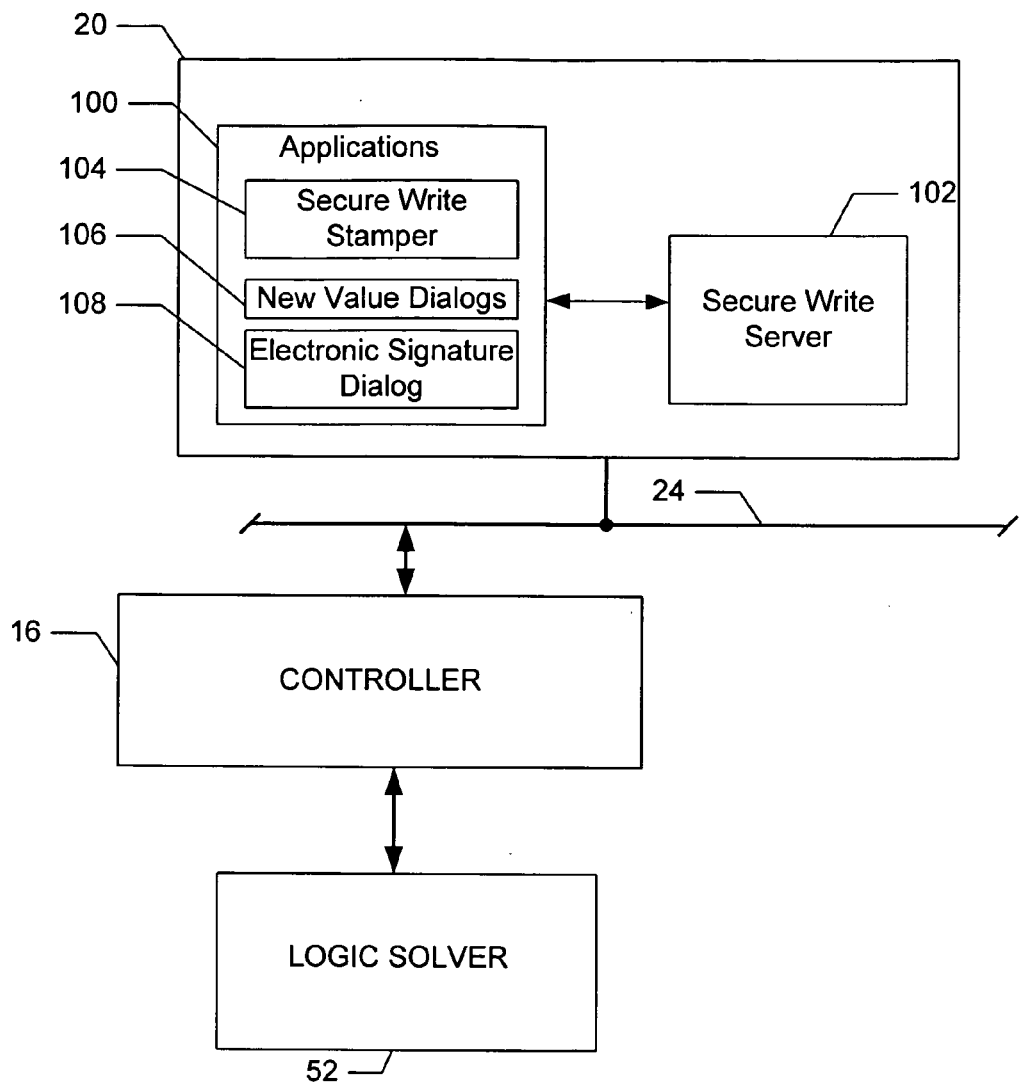
FIG. 2 is a more detailed block diagram depicting one manner in which the active application station, the controller, and the logic solver of FIG. 1 may be configured to implement the example secure data write apparatus and methods described herein.

FIG. 2 is a more detailed block diagram depicting one manner in which the active application station 20, the controller 16, and the logic solver 52 of FIG. 1 may be configured to implement the example secure data write apparatus and methods described herein. As depicted in FIG. 2, the application station 20 includes a plurality of applications 100 and a secure write server 102, all of which may be implemented using machine accessible or readable instructions, code, or software that, when executed (e.g., via one or more processors such as, for example, via the processor system 902 shown in FIG. 9), cause the application station 20 to perform various operations as set forth in more detail below.

In general, the applications 100 include software configured to perform various control system configuration functions, diagnostic functions, run-time functions, etc. The applications 100 may be implemented to provide graphical interfaces (e.g., screens, windows, etc. including graphical representations of equipment, devices, process conditions, etc.) with which a system operator, engineer, or any other authorized user or person may interact to configure the process control system 10 (FIG. 1), monitor the process control system 10, and/or troubleshoot the process control system 10.

As depicted in FIG. 2, the applications 100 include a secure write stamper 104, which enables a system operator or user to select graphical objects and, as described in greater detail below, to generate and associate graphical secure write dialogs and executable scripts with those selected objects. For example, a user may select a graphical object such as a safety instrumented function block via a graphical configuration interface provided by a graphical configuration application. The secure write stamper application 104 may then be invoked to interact with the user to automatically generate an executable script and one or more graphical dialogs that are associated with the selected safety instrumented function block. More specifically, the secure write stamper application 104 prompts the user for information needed to automatically generate secure write dialogs and scripts for a selected entity within the process control system 10 (FIG. 1).

The graphical dialogs (e.g., windows including textual information, graphical information, etc.) and the executable scripts generated by the secure write stamper application 104 are configured so that if the user selects the safety instrumented function block to change a parameter value and/or to send a command to the safety instrumented function block within the context of a run-time application, the user is automatically prompted via the graphical dialogs for authorization information, confirmation information, new value information, and/or command information. Additionally, the executable scripts, code, or instructions underlying the graphical dialogs are executed to cause one or more of the applications 100 (including the new value dialogs 106 and/or the electronic signature dialog 108), the secure write server 102, and the controller 16 to cooperate to write new parameter value information and/or command information to the logic solver 52 (and/or the redundant logic solver 54) using a secure data write protocol. The secure data write protocol substantially minimizes or eliminates the possibility of corrupt or unauthorized data from being written to the logic solver 52 and, thus, its associated safety instrumented function(s).

It should be recognized that while the example of FIG. 2 depicts the logic solver 52 as communicatively coupled to the application station 20 via the controller 16, other communication schemes may be used instead. For instance, the logic solver 52 may be communicatively coupled to the application station 20 and/or the controller 16 via the LAN 24 and/or a communication link (not shown) that is separate or independent from the LAN 24. Further, if desired or needed to meet applicable safety standards, multiple, redundant communication links (not shown) may be used to communicatively couple the logic solver 52 to the controller 16 and/or the application station 20. It should also be recognized that while the logic solver 52 is shown in FIG. 2 as being physically dependent from the controller 16, it may nevertheless be desirable or necessary (e.g., to meet certain safety standards) to ensure that power supply lines and connections, communication links, etc. coupled to the logic solver 52 are separate or functionally independent from those used by the controller 16. Still further, although the logic solver 52 and the controller 16 are shown as being physically separate, the logic solver 52 and the controller 16 could be physically integrated.

Still further, while the example secure write server 102 is shown as being integral or resident on the application station 20, the secure write server 102 could instead be incorporated within another device or system such as, for example another application station. In that case, the secure write server 102 may be communicatively coupled to the application station 20 via one or more separate safety compliant communication links(s).

Figure 3:
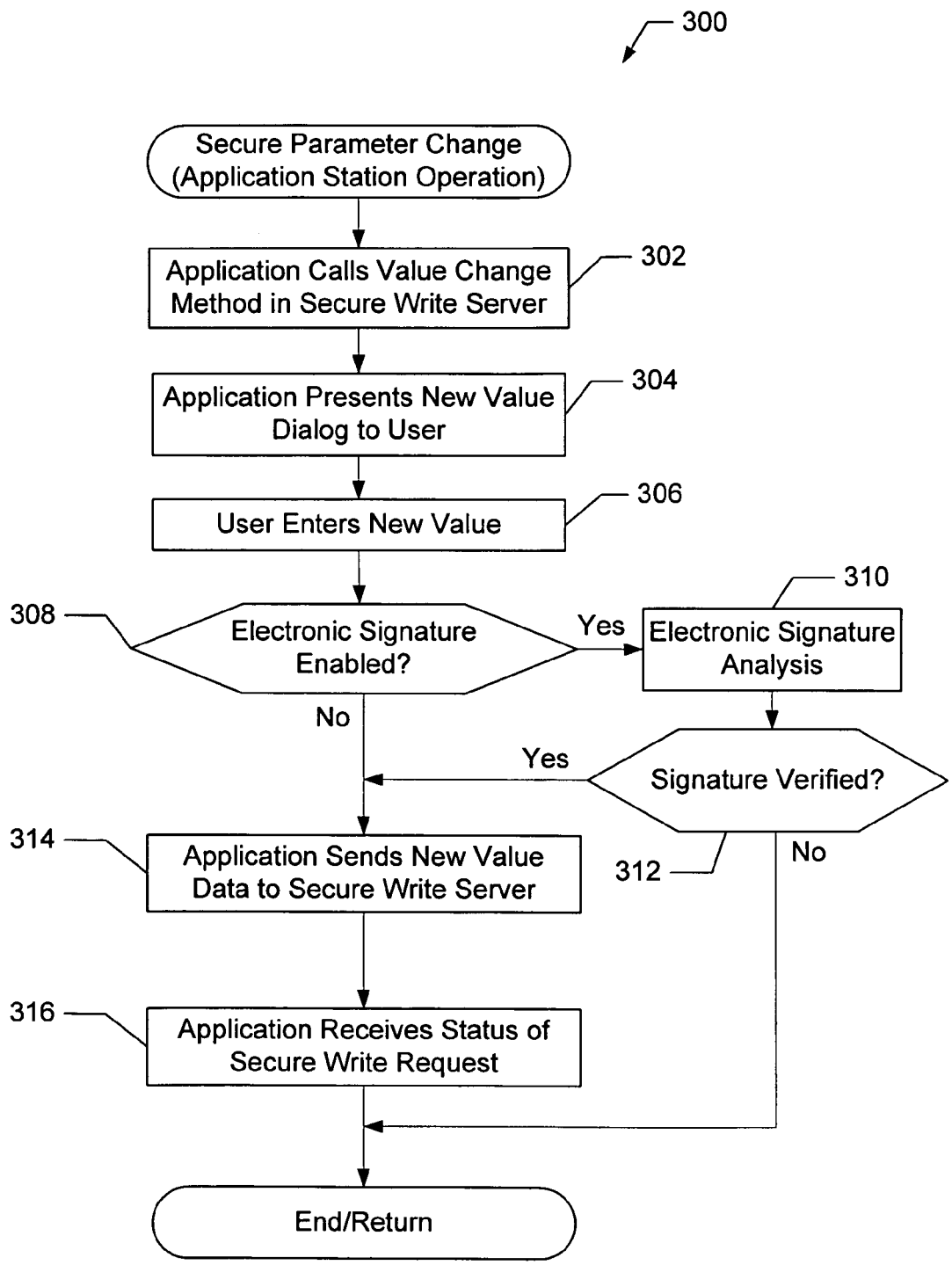
FIG. 3 is flow diagram that depicts an example method that may be used by the active application station of FIGS. 1 and 2 to change a secure parameter.

FIG. 3 is flow diagram that depicts an example method 300 that may be used by the application station 20 (FIG. 2) to change a secure parameter (e.g., a parameter associated with a safety instrumented function) in the logic solver 52 (FIG. 2). More specifically, the example method 300 enables one of the applications 100 (FIG. 2) executable by the application station 20 to change a secure parameter associated with a safety instrumented function performed by the logic solver 52. For example, a system operator or other authorized user interacting with a configuration or run-time application may desire (or be required to) change the secure parameter to achieve a desired safety condition or level, to verify the operation of a safety-related component or device (e.g., the operability of a final control element such as a safety valve), to test the operation of one or more safety instrumented functions, etc.

As described in greater detail below in connection with FIGS. 10-16, some or all of the interactions between system operators or other users and the various aspects of the example secure data write methods and apparatus described herein may involve interactive graphical displays, interfaces, or dialogs. As will be discussed below, such graphical displays, interfaces, or dialogs may facilitate the invocation(s) of underlying scripts, code, or instructions that cause the application station 20, the secure write server 102, the controller 16, and/or the logic solver 52 to cooperate to perform secure data writes in a manner that substantially eliminates the possibility of the logic solver 52 not receiving data or information, the logic solver 52 acting on corrupt information or data, the logic solver 52 acting on spurious data, etc. Further, as is also discussed in greater detail below, such graphical displays, interfaces, or dialogs facilitate the ability of a system operator or other user to configure or change safety-related systems and to send information or data to the logic solver(s) associated with those safety-related systems while ensuring compliance with a safety-related standard such as IEC 61508.

Returning in detail to the example method 300 of FIG. 2, in response to a system operator or user request, or in response to a request made by a software application, the application (e.g., a run-time application) calls a value change method (e.g., a SetValue method) in the secure write server 102 of FIG. 2 (block 302). When calling the value change method, the application may pass the path (e.g., the location of the parameter within the logic solver 52), the type of the parameter, and the current value of the parameter to the secure write server 102. A system operator or other user may effect a call to the value change method in the secure write server 102 by, for example, selecting a graphical object, which may represent a device, equipment, a safety instrumented function block, etc., that has been associated with underlying script, code, or instructions using, for example, the secure write stamper 104, which is discussed in greater detail below.

After the application calls the value change method at block 302, the application presents a new value dialog (e.g., selected from the dialogs 106 of FIG. 2) to the system operator or user (block 304). In general, the new value dialog displays the parameter path and the current value of the parameter via a graphical window or other display, which may include a variety of textual and graphical information to facilitate the changing of the value of the parameter. The system operator or user then interacts with the new value dialog presented at block 304 to enter a new desired parameter value (block 306). An example of a new value dialog is described in connection with FIGS. 15 and 16 below.

After the system operator or user enters the new parameter value at block 306, the example method 300 determines if electronic signature checking is enabled (block 308). If the electronic signature checking is enabled at block 308, the example method 300 performs an electronic signature analysis using any desired known signature analysis technique (block 310). After performing the electronic signature analysis at block 310, the example method 300 then determines or verifies if the signature is associated with a person authorized to make the requested parameter value change (block 312). If the signature is not verified (e.g., the person requesting the parameter value change is not authorized to make the requested change) at block 312, the example method 300 ends or returns to a calling routine.

On the other hand, if electronic signature checking is not enabled (block 308) or if the signature is verified at block 312, the example method 300 causes the application send the new parameter value to the secure write server 102 (FIG. 2) (block 314) that, as described in greater detail below, in turn, performs a secure write request to the logic solver 52 (FIG. 2). After sending the new parameter value to the secure write server 102, the application awaits receipt of the status of the secure write request (block 316).

Figure 4A:
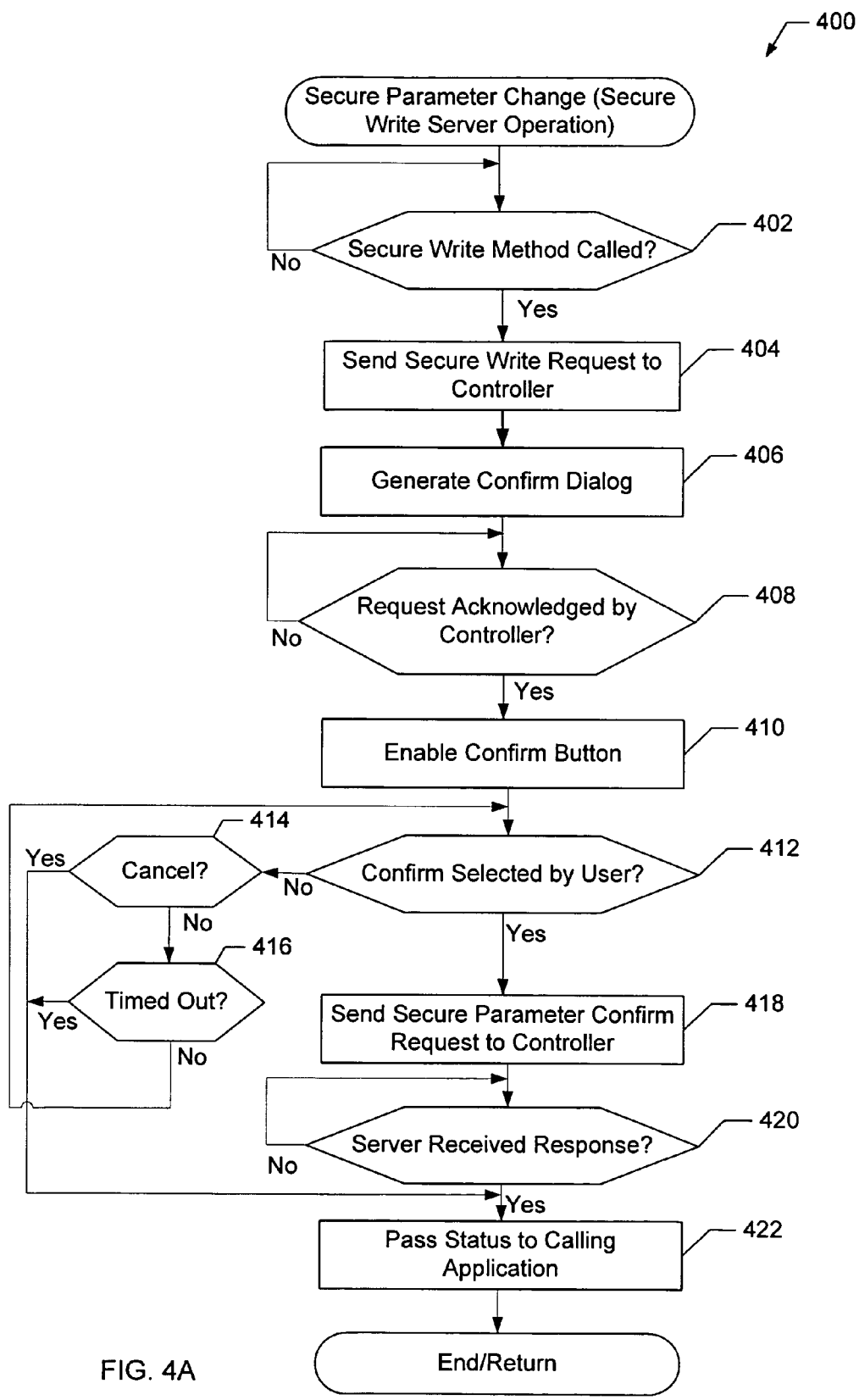
FIG. 4A is flow diagram that depicts an example method that may be used by the secure write server of FIG. 2 to change a secure parameter.

FIG. 4A is flow diagram that depicts an example method 400 that may be used by the secure write server 102 (FIG. 2) to change a secure parameter (e.g., a parameter associated with a safety instrumented function) in the logic solver 52 (FIG. 2). More specifically, the example method 400 enables the secure write server 102 to cooperate with the controller 16 (FIG. 2) to enable the controller 16 to change a parameter value in the logic solver 52.

Turning in detail to the example method 400 of FIG. 4A, the secure write server 102 (FIG. 2) determines if a secure write method has been called (block 402). For example, the secure write method may be called by an application as discussed above in connection with block 302 of FIG. 3. In any event, if the secure write server 102 determines that the secure write method has been called at block 402, the secure write server 102 sends a secure write request to the controller 16

(FIG. 2) (block 404). The secure write request includes parameter value change information, the path associated with the parameter to be changed, the new parameter value, and a CRC for the request.

After sending the secure write request at block 404, the secure write server 102 generates a confirm dialog (block 406). In particular, the confirm dialog is created by the secure write server 102 using a copy of the data sent by the application at block 314 of the example method 300 of FIG. 3. An example of a graphical/textual confirm dialog is described in connection with FIG. 16 below.

After generating the confirm dialog at block 406, the secure write server 102 (FIG. 2) awaits acknowledgement by the controller 16 (FIG. 2) that the secure write request sent by secure write server 102 at block 402 has been received intact (e.g., the CRC information sent with the request is used by the controller 16 to determine that the raw data received has been received substantially intact or without corruption) (block 408). Once the secure write server 102 receives an acknowledgement of receipt of the secure write request by the controller 16, the secure write server 102 enables the confirm button or other graphic associated with the confirm dialog generated at block 406 (block 410).

After the enable button has been enabled at block 410, the secure write server 102 determines if the system operator or other user has selected the confirm button (i.e., has confirmed or verified the secure parameter value change) (block 412). If the user has not selected the confirm button at block 412, the server 102 determines if the user has selected a cancel button (block 414) or if the period in which a confirmation must be selected has timed out (block 416). If neither a request to cancel nor a timeout have occurred, the secure write server 102 returns control to block 412. On the other hand, if either a request to cancel (block 414) or a timeout (block 416) have occurred, the server 102 passes control to block 422.

Following a confirmation at block 412, the secure write server 102 sends a secure parameter confirm request to the controller 16 (block 418). The secure parameter confirm request is sent to the controller 16 together with a parameter value change command, the path associated with the parameter to be changed, the new parameter value received from the confirm dialog (initiated at block 406), and the CRC for the confirm request.

After sending the parameter value change confirm request to the controller 16, the secure write server 102 awaits a response from the controller 16 indicating, as described in greater detail below, that the controller 16 has received a response from the logic solver 52 (block 420). In turn, following receipt of the response from the controller 16 at block 420, the secure write server 102 sends secure write status (e.g., information indicating that the requested parameter value change, command, etc. has been completed or otherwise effected) to the calling application (block 422). As described above, such status is received by the calling application at, for example, block 316 of the example method 300 of FIG. 3.

Thus, as can be appreciated from the foregoing, the secure write server 102 sends the parameter value change information to the controller 16 twice. More specifically, the secure write server 102 sends the parameter value change information to the controller 16 a first time in response to parameter value change information sent to it by the application (e.g., at block 314 of FIG. 3), and sends redundant (e.g., identical or at least substantially identical) parameter value change information to the controller 16 at a second time in connection with a confirm dialog (e.g., at blocks 406 to 418 of FIG. 4A). As described in greater detail below, the redundant parameter value change information is used by the controller 16 and the logic solver 52 to substantially eliminate the likelihood that information (such as parameter value change information) does not reach (i.e., is not received by) the logic solver 52, that corrupt information reaches and is acted on by the logic solver 52, and/or that spurious information reaches and is acted on logic solver 52. In this manner, a safety instrumented system such as the example system 10 of FIG. 1 can better comply with safety-related standards (e.g., the IEC 61508 standard).

Figure 4B:
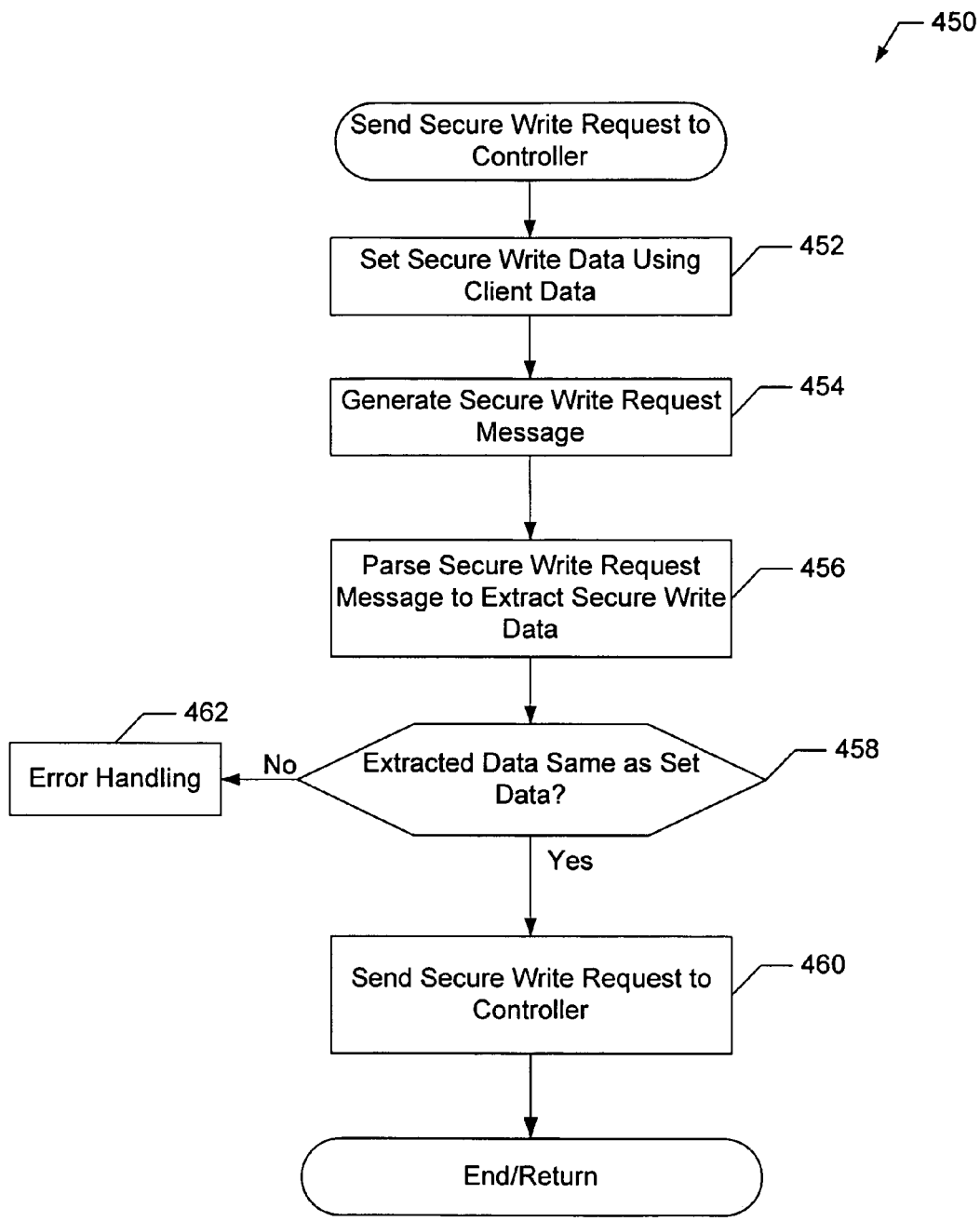
FIG. 4B is a flow diagram that depicts an example method that may be used by the secure write server of FIG. 2 to send a secure write request to the controller of FIG. 2.

FIG. 4B is a flow diagram that depicts an example method 450 that may be used by the secure write server 102 of FIG. 2 to send a secure write request (block 404 of FIG. 4A) to the controller 16 of FIG. 2. Initially, the secure write server 102 sets the secure write data using client data (e.g., received from one of the applications 100 sent at, for example, block 316 of FIG. 3 or block 708 of FIG. 7) (block 452). The secure write server 102 then generates a secure write request message containing the secure write data set at block 452 (block 454). The secure write server 102 then parses the secure write request message generated at block 454 to extract the secure write data therefrom (block 456). The server 102 then compares the data extracted at block 456 to that set at block 452 (block 458). If the extracted data and the set data are found to be the same at block 458, the secure write server 102 sends the secure write request message to the controller 16 (block 460) and the server 102 passes control to block 406 of FIG. 4A. The parsed data extracted at block 456 is used by the secure write server 102 at block 406 of FIG. 4A to generate the data or command information shown in the confirm dialog. In this manner, the user may be shown the contents of the message for which confirmation is subsequently requested at block 412 of FIG. 4A. If at block 458, the extracted data and the set data are found to be different, the secure write server 102 may perform an error handling routine in any known manner (block 462).

Figure 4C:
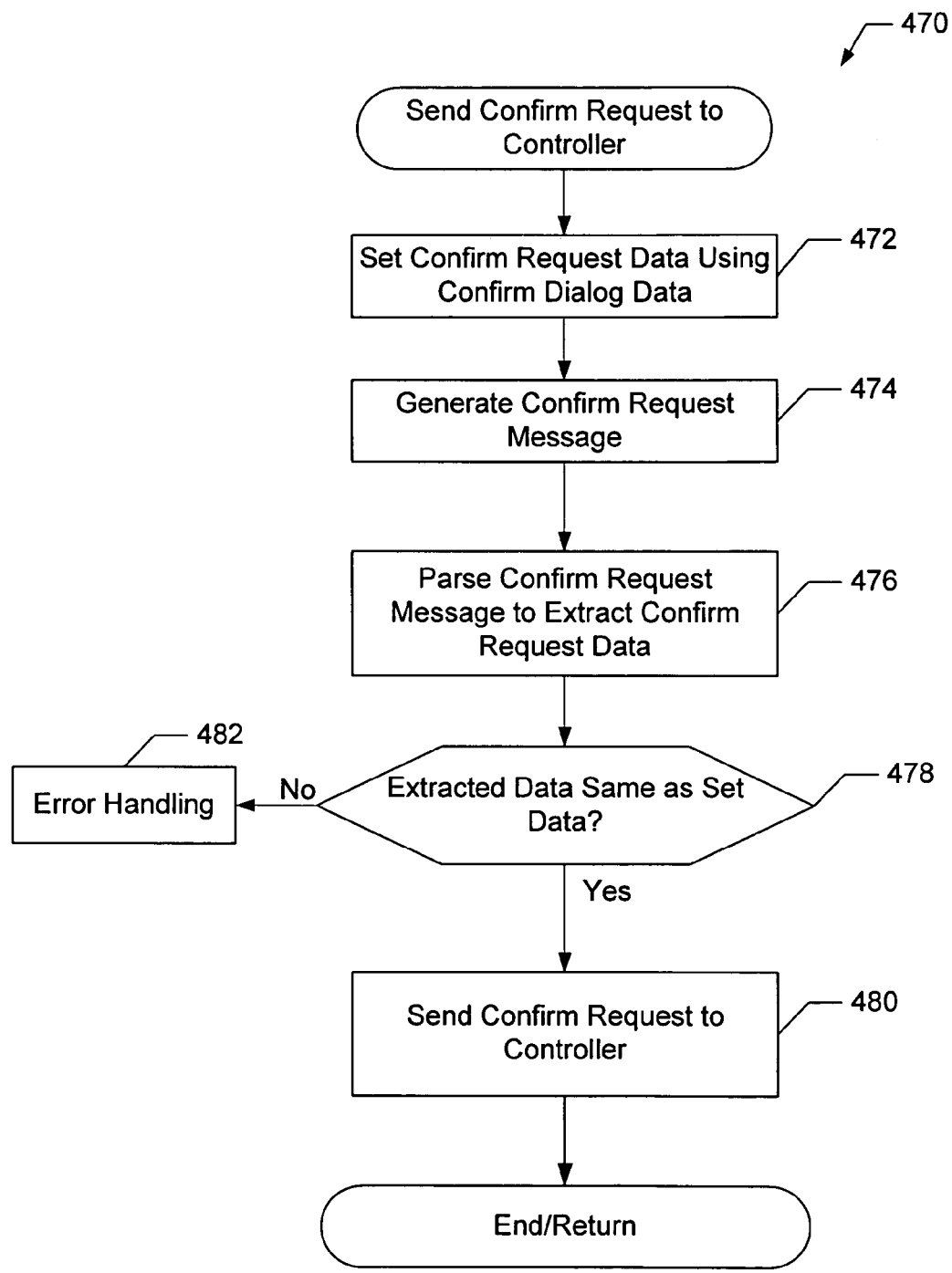
FIG. 4C is a flow diagram that depicts an example method that may by used by the secure write server of FIG. 2 to send a secure confirm request to the controller of FIG. 2.

FIG. 4C is a flow diagram that depicts an example method 470 that may by used by the secure write server 102 of FIG. 2 to send a secure confirm request (block 418 of FIG. 4A) to the controller 16 of FIG. 2. Initially, the secure write server 102 sets the confirm request data using data received from the confirm dialog (block 406 of FIG. 4A) (block 472). The secure write server 102 then generates a confirm request message containing the confirm request data set at block 472 (block 474). The secure write server 102 then parses the confirm request message generated at block 474 to extract the confirm request data therefrom (block 476). The server 102 then compares the data extracted at block 476 to that set at block 472 (block 478). If the extracted data and the set data are found to be the same at block 478, the secure write server 102 sends the confirm request message to the controller 16 (block 480) and the server 102 passes control to block 420 of FIG. 4A. If at block 478, the extracted data and the set data are found to be different, the secure write server 102 may perform an error handling routine in any known manner (block 482).

As can be appreciated from the foregoing, the secure write requests and confirm requests are generated using independent processes. Such a technique enables the detection (e.g., a visual detection by a user viewing a confirmation dialog, an automatic detection as a result of a failed comparison, etc.) of a single fault or error as well as multiple faults or errors in the process of transforming the data into messages to be conveyed to a controller and/or a logic solver.

Figure 5:
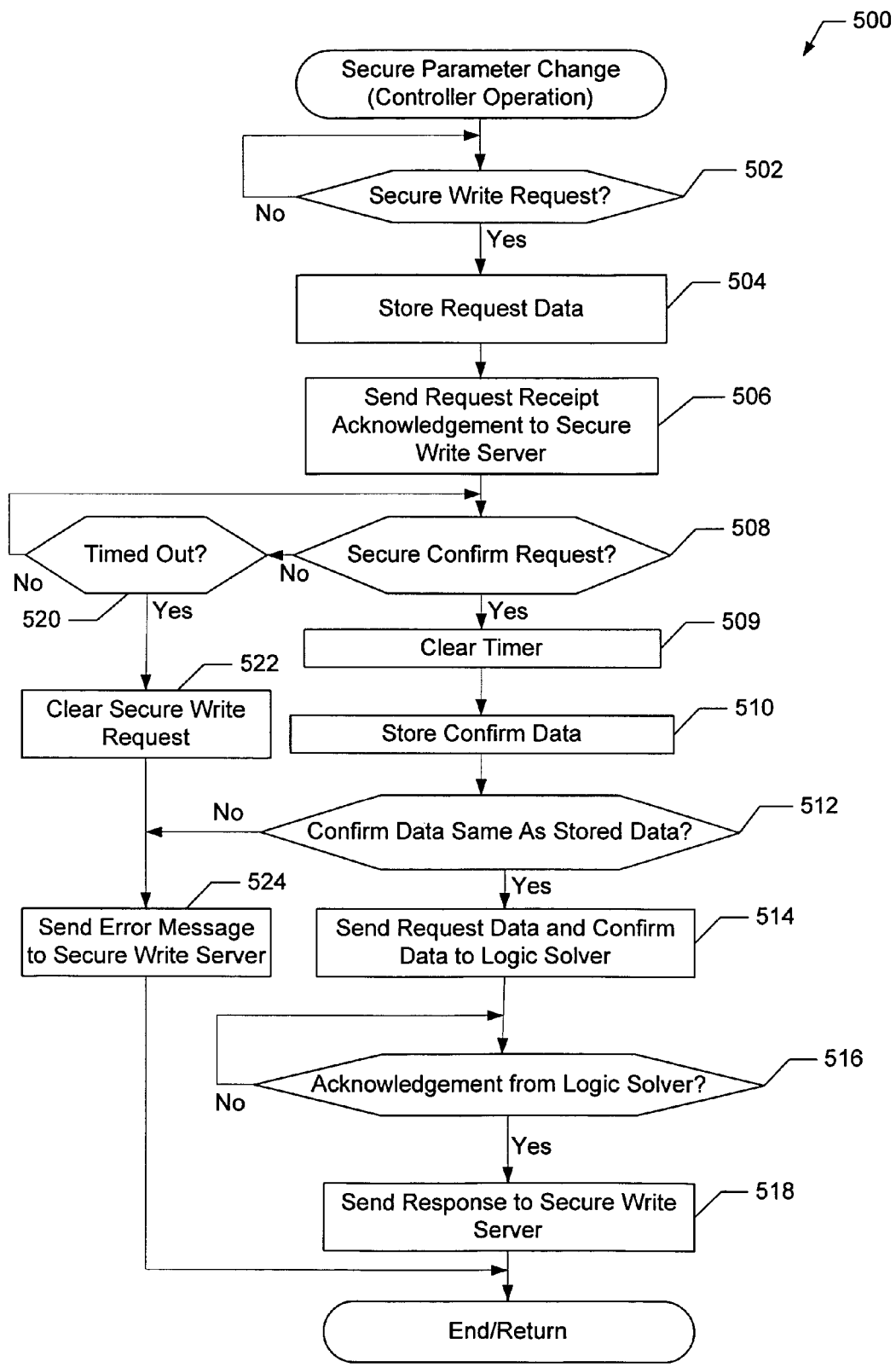
FIG. 5 is flow diagram that depicts an example method that may be used by the controller of FIG. 2 to change a secure parameter.

FIG. 5 is flow diagram that depicts an example method 500 that may be used by the controller 16 (FIG. 2) to perform a change of a secure parameter (e.g., a parameter associated with a safety instrumented function) in the logic solver 52 (FIG. 2). More specifically, the example method 500 compares the redundant parameter value change information that it receives from the secure write server 102 and, based on the comparison, communicates with the logic solver 52 to ensure that the logic solver 52 receives the desired parameter value change information and does not change a parameter value in response to corrupt or spurious data.

Turning in detail to the example method 500, the controller 16 (FIG. 2) determines if a secure write request has been received (block 502). If a secure write request (e.g., a parameter value change to be effected in the logic solver 52) has been received from the secure write server 102 (e.g., at block 404 of FIG. 4A), the controller 16 stores the request data (block 504). The request data (e.g., the path information associated with the parameter value to be changed in the logic solver 52, the new parameter value, CRC information, etc.) may be stored in a memory location associated with a function block or module associated with the parameter. After storing the secure write request data at block 504, the controller 16 sends a request receipt acknowledgement to the secure write server 102 (block 506). As discussed above, the secure write sever 102 monitors for the request receipt sent by the controller 16 (block 506) at block 408 of FIG. 4A.

The controller 16 then awaits receipt of the secure parameter confirm request, which is sent by the secure write server 102 at block 422 of FIG. 4A (block 508). When the secure parameter confirm request information (i.e., the redundant parameter value change information) is received at block 508, the controller 16 clears the timer associated with the timeout mechanism discussed below (block 509) and stores the confirm request information in a second memory location that is also associated with the function block or module with which the data stored at block 504 is associated (block 510). The controller 16 then compares the secure request data (stored at block 504) to the secure confirm request data (stored at block 510) and, if the data matches (or is at least substantially identical), the controller 16 sends the original secure write request data (stored at block 504) and the matching secure confirm request data (stored at block 510) to the logic solver 52 (block 514).

After sending the data to the logic solver 52 at block 514, the controller 16 awaits an acknowledgement of receipt of the data by the logic solver 52 (block 516). Upon receipt of the acknowledgement at block 516, the controller 16 sends an acknowledgement or response to the secure write server 102 (block 518), which is received by the secure write server 102 at block 420 of FIG. 4A.

As depicted in the example method 500 of FIG. 5, the controller 16 employs a timeout mechanism in connection with receipt of a secure confirm request (block 508). In particular, if the controller 16 has not received the secure confirm request at block 508, the controller determines (e.g., based on a timer) whether a certain amount of time has elapsed since receipt of the secure write request data at block 502 (block 520). If a certain or predetermined amount of time has elapsed at block 520 (i.e., a timeout has occurred), the controller 16 clears the pending secure write request (block 522) and sends an appropriate error message to the secure write server 102 (block 524). The timeout time (i.e., the amount of time associated with a timeout condition) may be based on information sent to the controller 16 by, for example, the calling application via the secure write server 102 (e.g., via blocks 314, 404, and 418), a predetermined default value, or may be determined in any other desired manner.

In addition to a timeout-based error message, the controller 16 may also send an error message (block 524) in the case that the original request data (i.e., the data stored at block 504) and the confirm data (stored at block 510) do not match (e.g., are not identical or at least substantially identical) at block 512.

Figure 6:
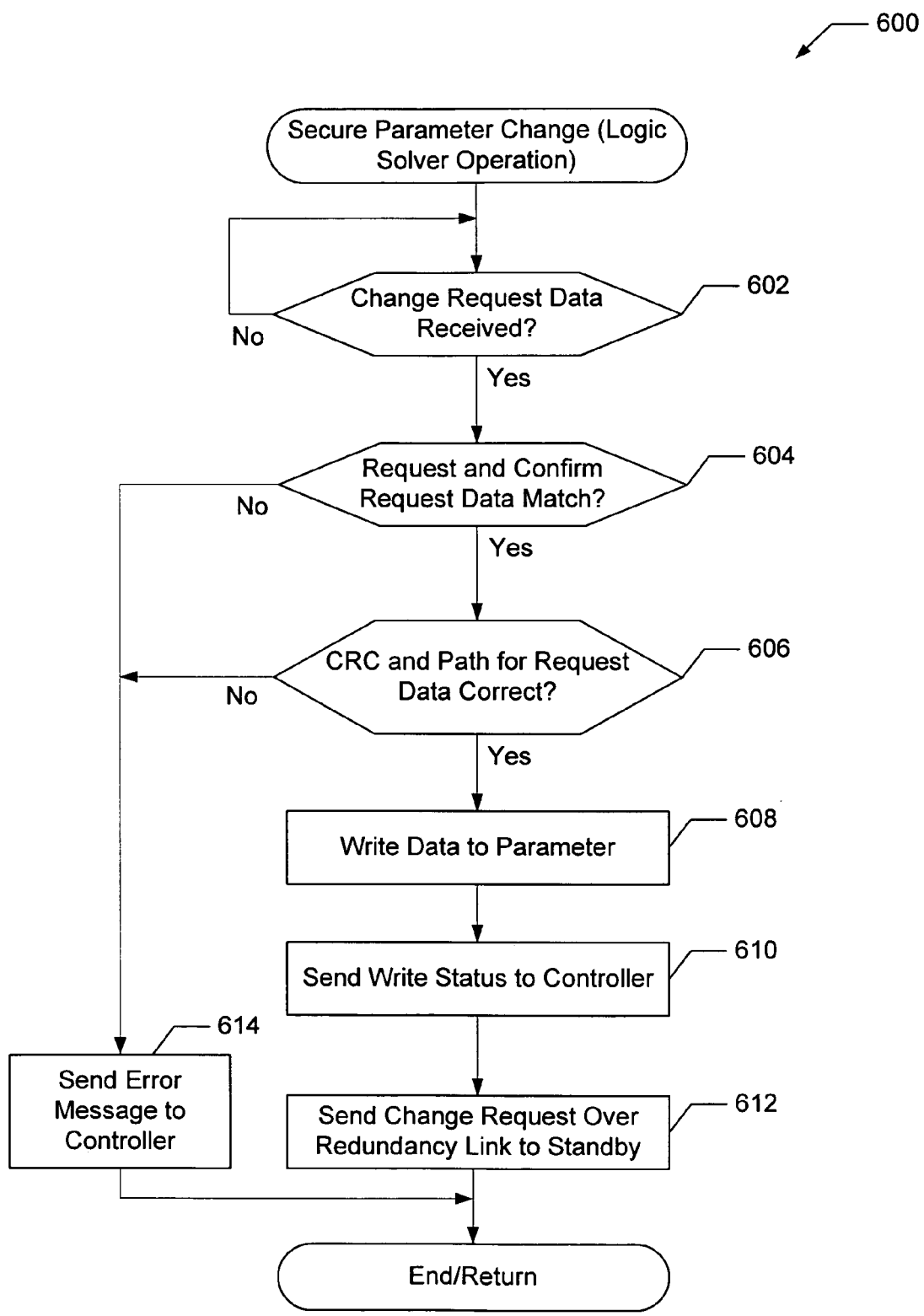
FIG. 6 is flow diagram that depicts an example method that may be used by the logic solver of FIG. 2 to change a secure parameter.

FIG. 6 is flow diagram that depicts an example method 600 that may be used by the logic solver 52 (FIG. 2) to perform a change of a secure parameter (e.g., a parameter associated with a safety instrumented function) in the logic solver 52. More specifically, the example method 600 analyzes path and CRC information and determines if the original secure write request information and the confirm secure write request information match (or at least substantially match) to determine, for example, if a new value can be safely written to a parameter associated a safety instrumented function of the logic solver 52.

With reference to the detailed flow diagram of FIG. 6, the logic solver 52 determines if parameter value change request data or information has been received (block 602). The parameter value change request data includes the secure write request data and the confirm secure write request data sent at block 514 of FIG. 5. The logic solver 52 then determines if the original secure write request data and the confirm request data match (block 604). The matching operation at block 604 may be redundant in view of the matching operation previously performed by the controller 16 at block 512 of FIG. 5. However, such redundant match detection at the logic solver 52 further enhances safety in a situation where the controller 16 sends the secure write request information to the logic solver 52, despite a match failure at block 512 of FIG. 5.

If the secure write request data and the confirm write request data match (e.g., are identical or at least substantially identical) at block 604, the logic solver 52 determines if the CRC(s) and the path for the request data are good, valid, correct, etc. (block 606). If the CRC(s) and the path are correct at block 606, the logic solver 52 writes the new data (i.e., the new parameter value) to the parameter (block 608). After writing the new parameter value to the parameter at block 608, the logic solver 52 sends write status to the controller 16 (block 610). As discussed above, the controller 16 monitors for the write status information at block 516 of FIG. 5. Following the communication of the write status information to the controller 16, the logic solver 52 sends the change request information (i.e., the new parameter value information) via the redundancy link 60 (FIG. 1) to the standby logic solver (e.g., the logic solver 54 of FIG. 1).

As depicted in FIG. 6, the logic solver 52 may also be configured to send error messages to the controller 16 (block 614). In particular, if the original secure write request data and the subsequently generated confirm request information sent by the controller 16 to the logic solver 52 do not match at block 604, or if the CRC and path information are not correct at block 606, an appropriate error message is sent to the controller 16 at block 614.

While the example methods discussed above in connection with FIGS. 3, 4, 5, and 6 depict example manners in which the application station 20, the controller 16, and the logic solver 52 may be configured to cooperate to perform a secure parameter value change, the example methods may be more generally applicable to writing other data to a logic solver (e.g., the logic solver 52). For example, as discussed below in connection with FIG. 7, the application station 20, the controller 16, and the logic solver 52 may be configured to cooperate to perform secure commanding of the logic solver 52. In other words, a system operator or other user may, for example, via a run-time application executed at the application 20, send one or more commands to the logic solver 52 in a manner that is compliant with one or more safety standards applicable to safety instrumented systems. Such secure commanding substantially minimizes the likelihood that one or more commands sent by a system operator or other user do not reach the logic solver 52, that one or more corrupt commands are processed or executed by the logic solver 52, and/or that one or more spurious commands are processed or executed by the logic solver 52.

Figure 7:
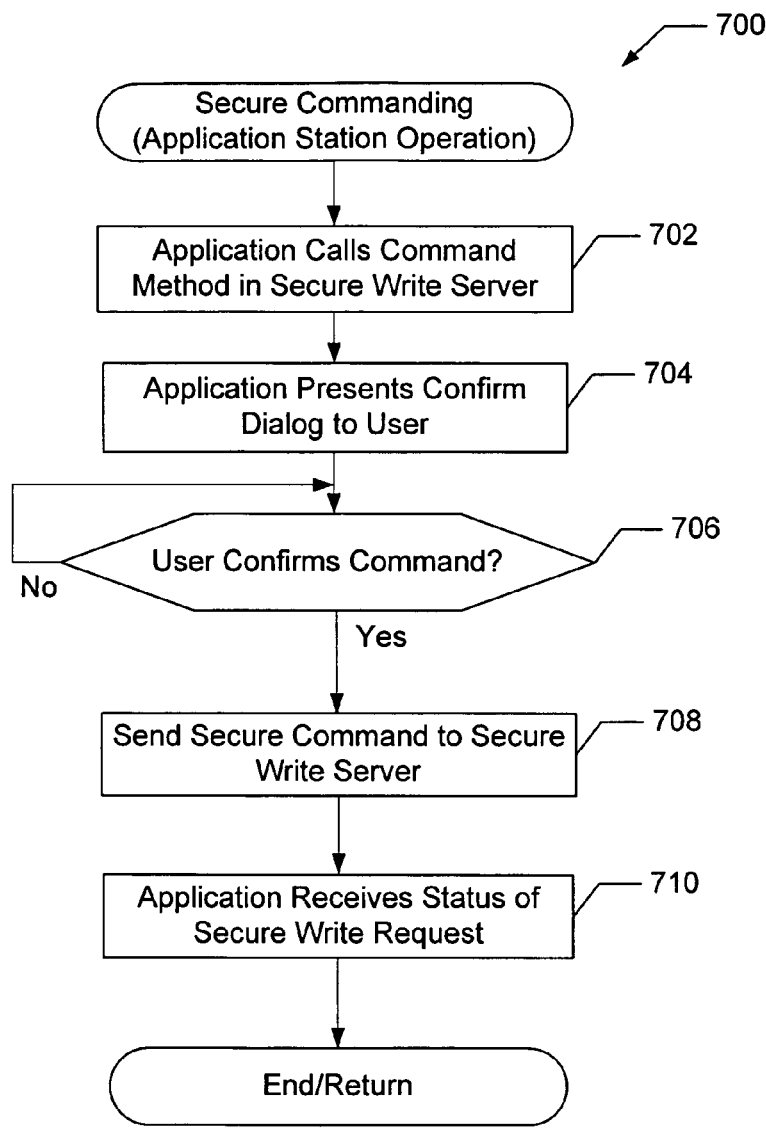
FIG. 7 is a flow diagram of an example method that may be used by the active application station of FIGS. 1 and 2 to send commands to the logic solver in a secure manner and in compliance with a standard for safety instrumented systems.

Turing in detail to FIG. 7, a flow diagram depicts an example method 700 that may be performed by the application station 20 to send commands to the logic solver 52 in a secure manner and in compliance with a safety-related standard for safety instrumented systems. Initially, in response to a system operator or other user selecting a graphic representative of a device, equipment, a function module, and/or a function block and entering a command (e.g., a forced switchover to a redundant logic solver) via an application (e.g., a run-time application), the application calls a secure commanding method in the secure write server 102 (block 702). The desired command may be entered as textual information via, for example, a keyboard and/or may be selected as a graphic object using, for example, a pointing device such as a mouse, trackball, etc.

After the application has called the secure commanding method in the secure write server 102 at block 702, the application presents a confirm dialog to the system operator or other user (block 704). The example method 700 then awaits a confirmation by the system operator or other user (block 706). Such a confirmation may be implemented by enabling the system operator to select a graphic confirm button, enter confirmation textual information, and/or via in any other desired manner. Once the secure commanding is confirmed at block 706, the application station 20 sends the secure command information to the secure write server 102 (FIG. 2) (block 708). At block 710, the application station 20 (and the application) receives the status of the secure write request associated with the secure command information sent at block 708.

In performing secure commanding of the logic solver 52, the secure write server 102, the controller 16, and the logic solver 52 are generally configured to carry out the secure commanding using the example methods of FIGS. 4, 5, and 6, respectively. However, instead of parameter value information being processed and conveyed between the application station 20, the secure write server 102, the controller 16, and the logic solver 52, command information is processed (e.g., stored, compared, etc.) and conveyed between the various entities.

To facilitate configuration of safety instrumented systems, the example system 10 of FIG. 1 includes the secure write stamper application 104. In general, the secure write stamper 104 enables a system operator or user to generate graphical objects and/or displays and underlying executable scripts for equipment, devices, function modules, function blocks, etc. associated with one or more safety instrumented functions. More specifically, the secure write stamper 104 facilitates the consistent, rapid, and substantially automatic generation of safety rated or compliant graphical dialogs and executable scripts for safety instrumented systems. The graphical dialogs and scripts may be invoked during run-time to enable a system operator or other user to effect a secure parameter value change in the logic solver 52, secure commanding of the logic solver 52, etc. using the example secure data write methods discussed above in connection with FIGS. 3-7.

Figure 8:
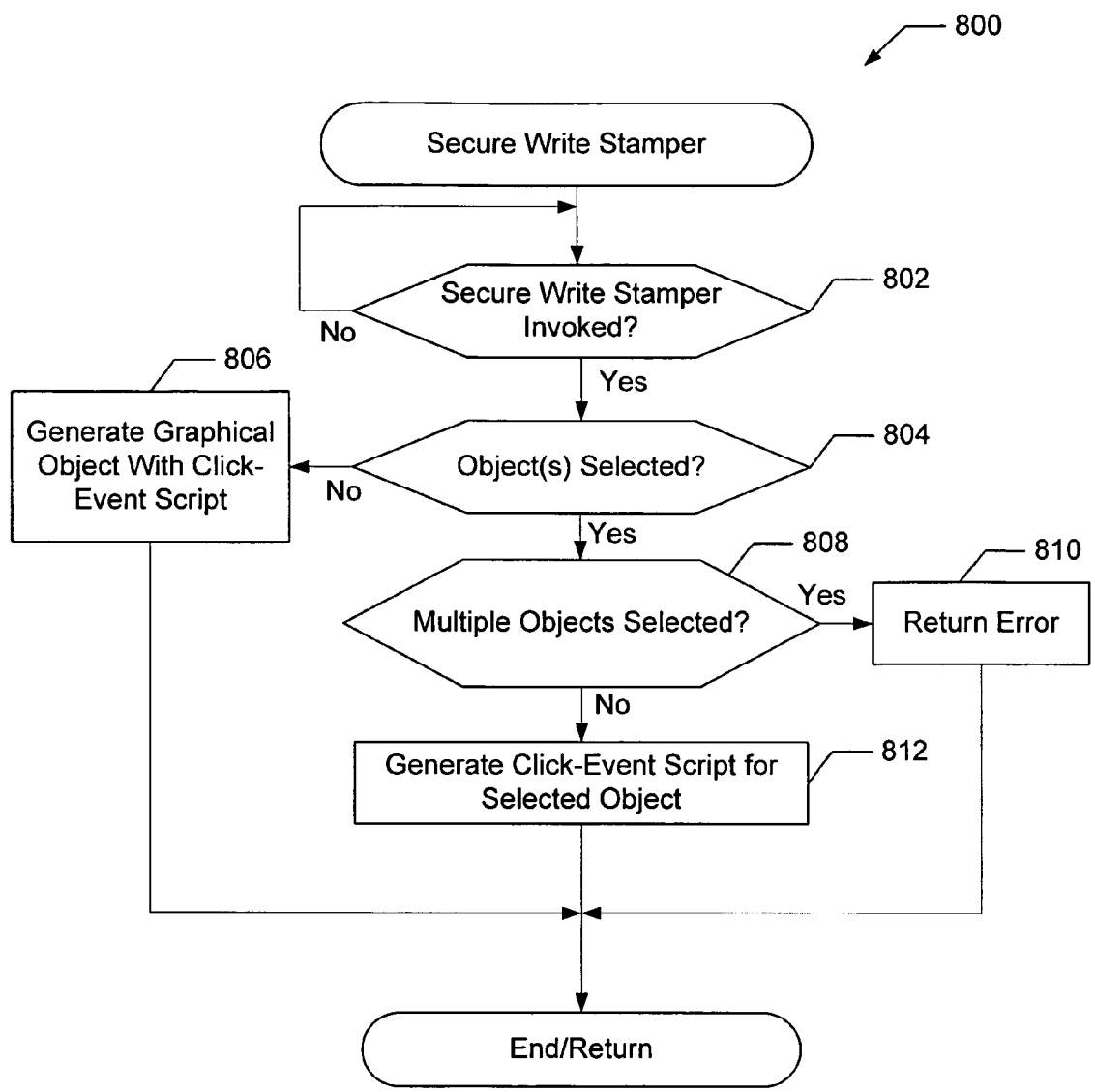
FIG. 8 is a flow diagram that depicts an example method that may be used to implement the secure write stamper of FIG. 2.

FIG. 8 is a flow diagram that depicts an example method 800 that may be used to implement the secure write stamper 104 (FIG. 2). Initially, the secure write stamper 104 may be invoked (block 802) during configuration of the example system 10 (FIG. 1) in response to, for example, a system operator or other user selecting (e.g., pointing and clicking via a pointing device such as a mouse to) a graphical object (e.g., a function block or module) associated with a safety instrumented function performed by one or both of the logic solvers 52 and 54. If the secure write stamper 104 has been invoked at block 802, the secure write stamper 104 determines if an object has (or if multiple objects have) been selected (block 804).

If the secure write stamper 104 has been invoked without having selected any object(s) at block 804, the secure write stamper 104 generates a graphical object and an associated or underlying click event script (block 806). The graphical object and underlying script are generated based on the logic solver parameter affected and/or command to be issued. As discussed in greater detail below in connection with FIGS. 10-16, in some examples, the graphical object may be a labeled button or the like that, when selected during run-time, executes an underlying script that enables a system operator or other user to interact with a graphical window, dialog, or other display to send a new parameter value and/or command information to the logic solver 52 (FIG. 2) using the example secure data write methods described herein.

If, at block 804, the secure write stamper 104 determines that at least one object has been selected, the secure write stamper 104 determines if multiple objects have been selected (block 808). If multiple objects have been selected at block 808, the secure write stamper 104 returns an error (block 810). On the other hand, if only one object has been selected (block 808), the secure write stamper 104 generates an appropriate click event script for (i.e., to be associated with) the selected object (block 812).

The functional blocks or operations shown in the example methods of FIGS. 3-8 may be implemented using any desired combination of software, firmware and hardware. For example, one or more microprocessors, microcontrollers, application specific integrated circuits (ASICs), etc. may access instructions or data stored on machine or processor accessible storage media to carry out the methods and to implement the apparatus described herein. The storage media may include any combination of devices and/or media such as, for example, solid state storage media including random access memory (RAM), read-only memory (ROM), electrically erasable programmable read-only memory (EEPROM), etc., optical storage media, magnetic storage media, etc. In addition, software used to implement the functional blocks may additionally or alternatively be delivered to and accessed by the processor or other device or devices executing the software via the Internet, telephone lines, satellite communications, etc.

Figure 9:
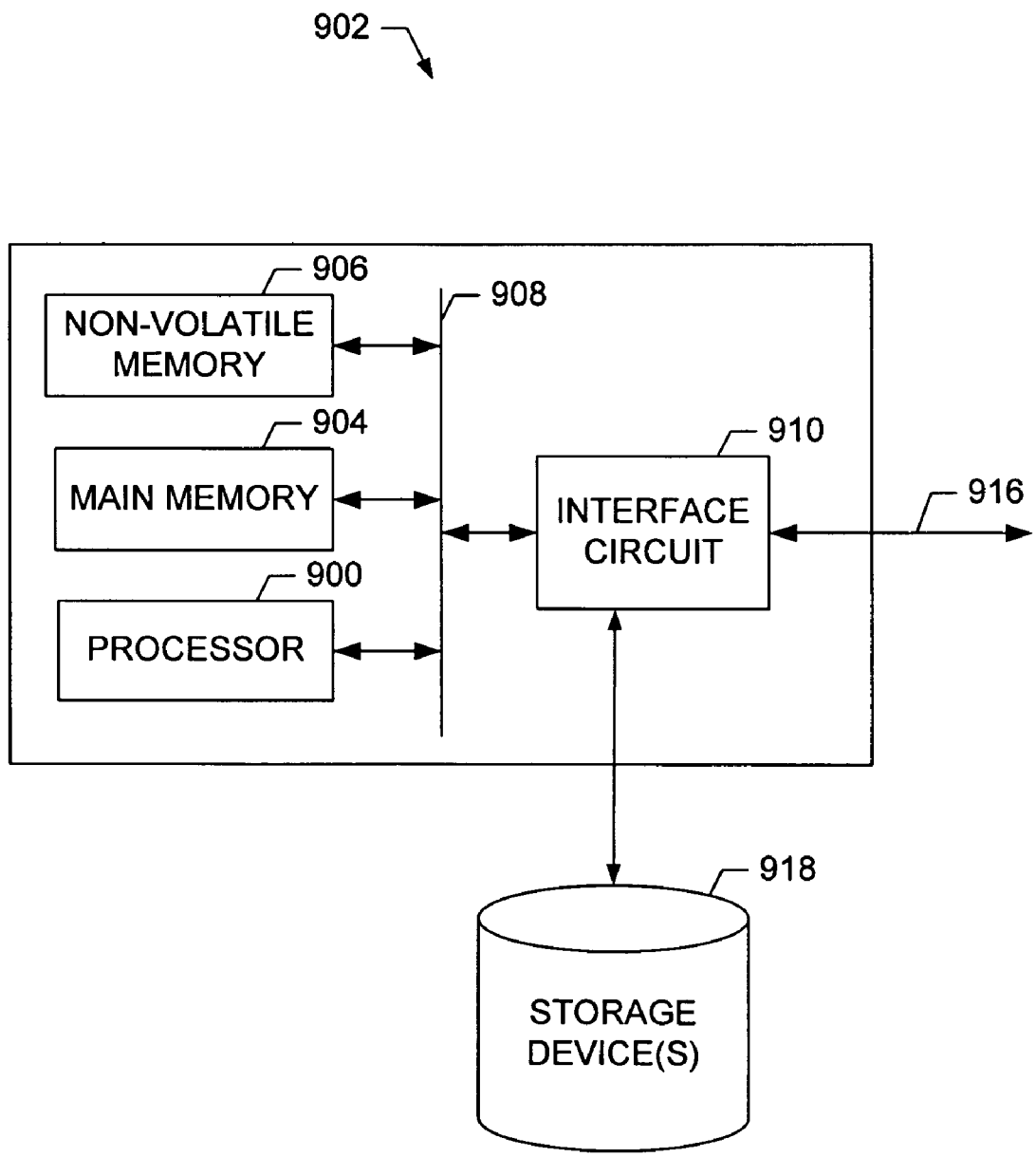
FIG. 9 is an example processor system that may be used to implement the apparatus and methods described herein.

FIG. 9 depicts an example processor system 902 that may be used to implement the apparatus and methods described herein. The example processor-based system 902 may be, for example, a server, a personal computer, or any other type of computing device.

The processor 900 may, for example, be implemented using one or more Intel® microprocessors from the Pentium® family, the Itanium® family or the XScale® family. Of course, other processors from other families are also appropriate. The processor 900 is in communication with a main memory including a volatile memory 904 and a non-volatile memory 906 via a bus 908. The volatile memory 904 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 906 may be implemented by flash memory and/or any other desired type of non-volatile memory device. Access to the memory 904 is typically controlled by a memory controller (not shown) in a conventional manner.

The system 902 also includes an interface circuit 910. The interface circuit 910 may be implemented by any type of well-known interface standard to, for example, enable the system 902 to communicate via one or more of the links 24, 32, 40, 42, 46, 48, 62, and 64.

The system 902 also includes one or more mass storage devices 918 for storing software and/or data. Examples of such mass storage devices include floppy disk drives, hard drive disks, compact disk drives and digital versatile disk (DVD) drives.

The foregoing example methods may be implemented in connection with one or more of the example graphical displays or dialogs discussed in detail below. In particular, in the case where the secure write stamper 104 is invoked and no object has been selected (block 804 of FIG. 8), the secure write stamper 104 may generate a graphical object (e.g., a labeled button) and associated click-event script (block 806) using the example graphical interface 1000 shown in FIG. 10. As depicted in the example interface graphical interface 1000, a parameter path field 1002 may prompt the system operator or other user for the full path (e.g., a path to a parameter value in the logic solver 52) of the parameter to be written. The example parameter path is associated with a safety instrumented function module "SIFMOD1," a block "CEM1," and a parameter "RESET1.B_CV."

The user may also optionally enter information in a % P parameter path field 1004. In this example, the % P parameter corresponds to the text "Main Gas Valve." The example graphical interface 1000 also enables a user to control various properties of the labeled button generated by the secure write stamper 104. For example, the user may enter a button label in a text field 1006 and may control the color and font used for any such text as well as the background color used for the labeled button graphic.

The user may also enter information in a numeric value field 1008. As described in greater detail below, the numeric value entered in the field 1008 is the value that is to be written to, for example, the logic solver 52 parameter (corresponding to the path specified in the field 1002) using the example secure write methods described herein and in response to selection of the labeled button during run-time.

The user may also enter data into a text information field 1010. Such information may include a textual phrase, question, etc. to be presented to the system operator or other user upon activation or selection of the labeled button during run-time. In this example, the system operator or user will be presented with the text "Do You Want to Reset the Main Gas Valve?" It should be noted that the "% P" shown in the example field 1010 is replaced at run-time with the text corresponding to the path specified in the field 1004, which in this case is "Main Gas Valve."

An option visibility animation field 1012 enables a user to enter a visibility expression. If entered, such a visibility expression may be used during run-time to provide a graphical animation when the labeled button is selected.

After a system operator or other user has entered information into some or all of the above-referenced data fields shown in the example graphical interface 1000, the system user or operator may select an OK button 1014. Selection of the OK button 1014 causes the secure write stamper 104 to generate a labeled button in accordance with the visual and functional requirements specified in the various data fields of the graphical interface 1000.

Figure 10:
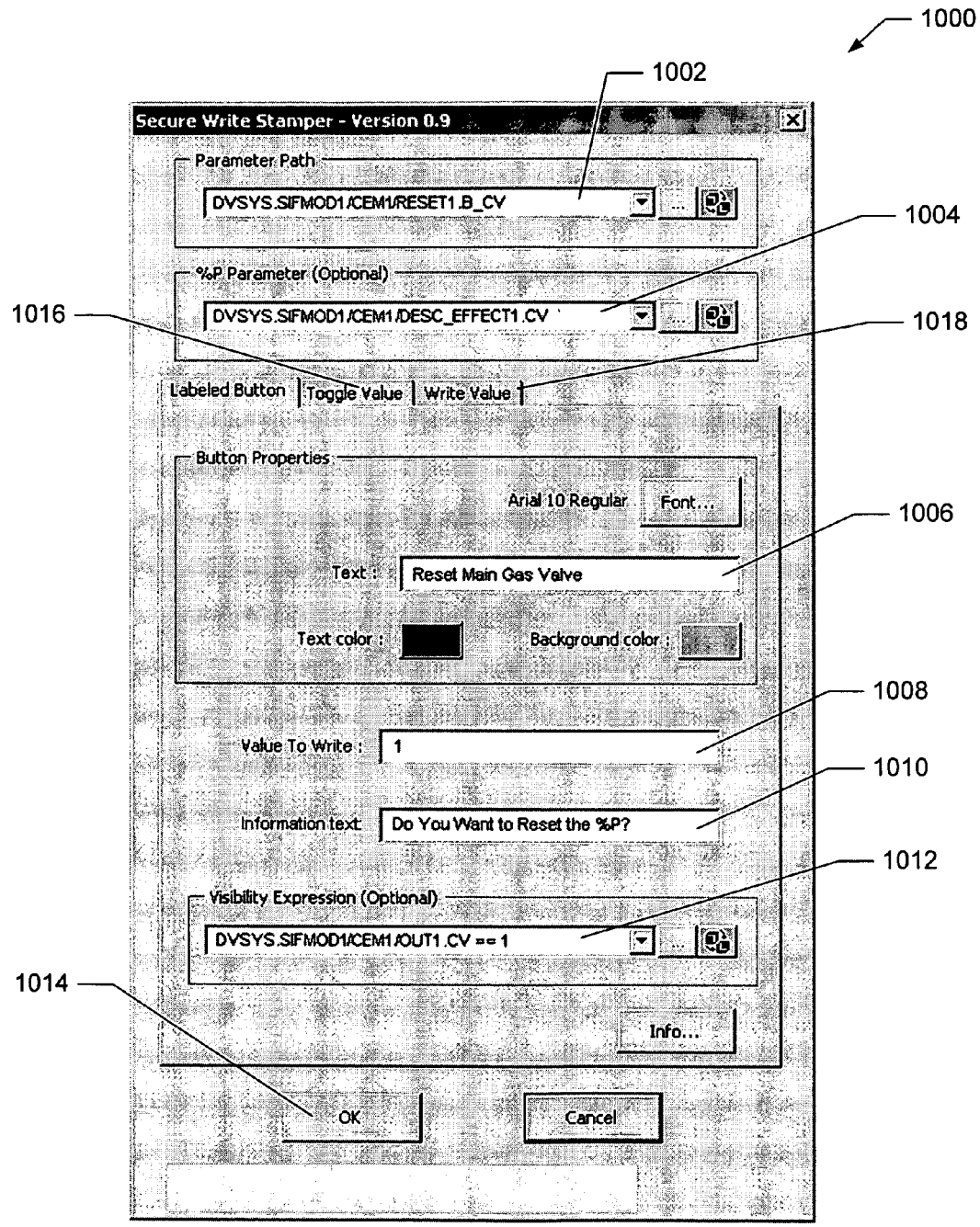
FIGS. 10-16 are example graphical interfaces and dialogs that may be used to implement the secure data write apparatus and methods described herein.
Figure 11:
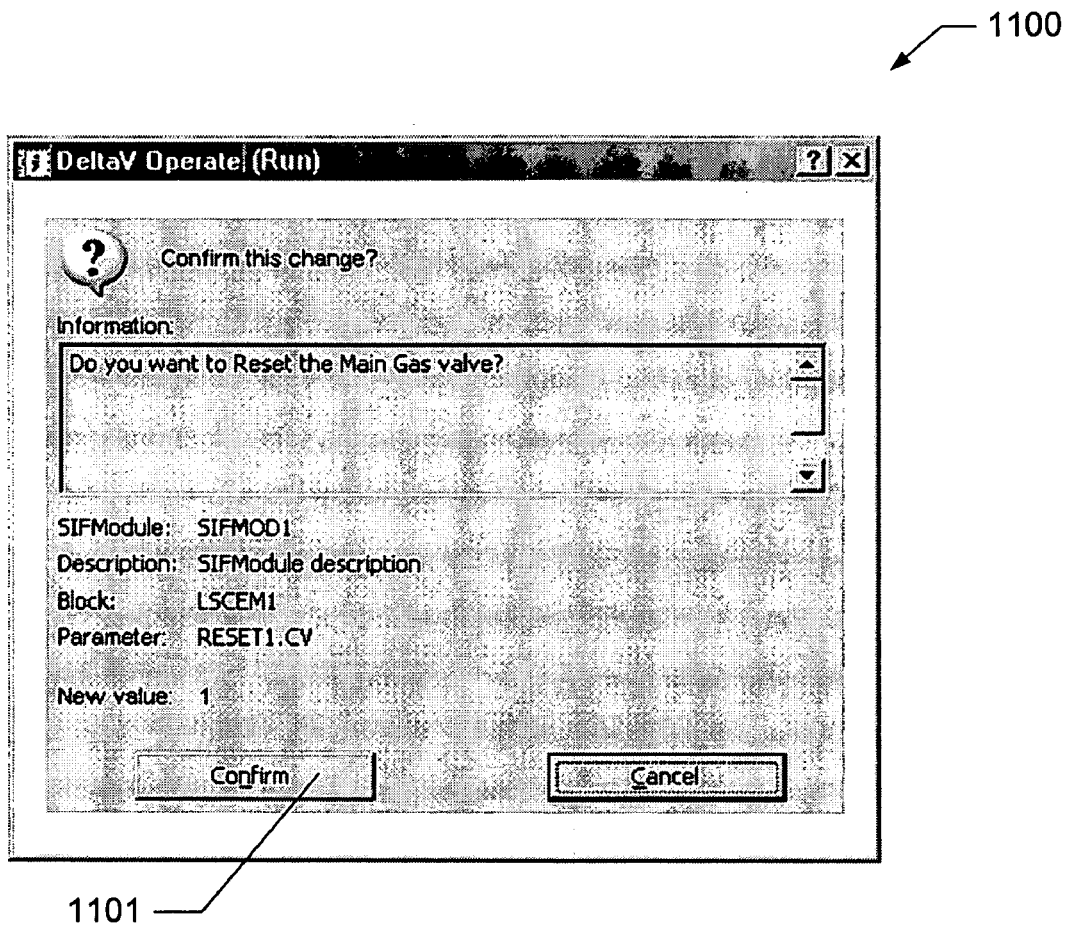

FIG. 11 depicts an example graphical dialog 1100 that is generated when the labeled button created via the example graphical interface 1000 of FIG. 10 is selected or otherwise invoked during run-time. The example graphical dialog 1100 may overlay a script or scripts that perform one or more of the operations associated with the application station 20. Specifically, the underlying script or scripts may perform one or more of the operations described in connection with the example method of FIG. 7. For example, the example graphical dialog 1100 may be presented at block 704 (FIG. 7) and user selection of a confirm button 1101 results in confirmation at block 706 (FIG. 7) and writing of the secure command (ultimately to the logic solver 52), which in this example is a reset command, at block 708 (FIG. 7).

Figure 12:
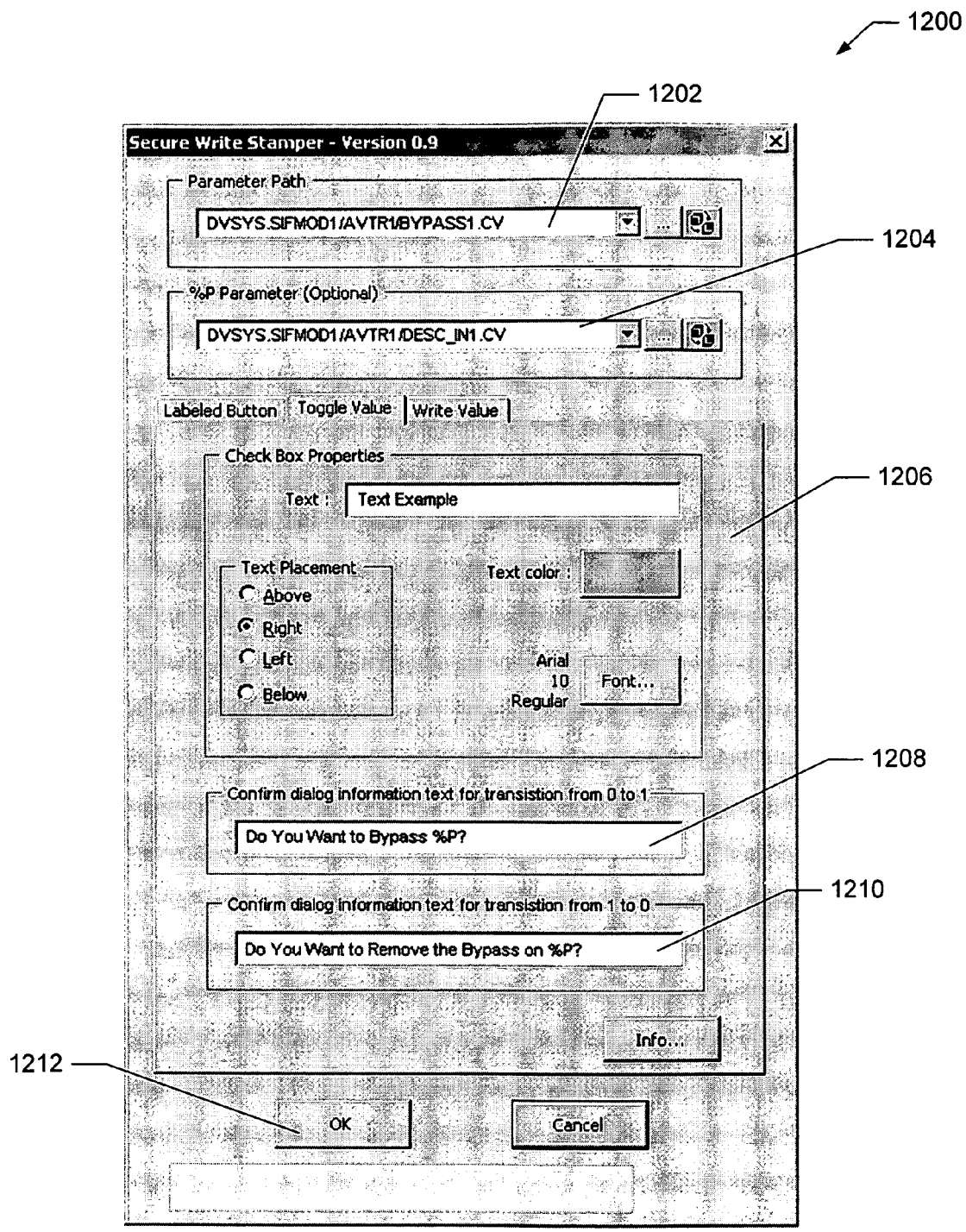

FIG. 12 depicts an example secure write stamper graphical interface 1200 that is presented if the toggle value tab 1016 (FIG. 10) is selected upon invocation of the secure write stamper 104. The example interface 1200 enables a system operator or other user to create a toggle value or two-state checkbox, which may be used during run-time to toggle the value of a parameter from zero to one or one to zero. In particular, such a toggle value checkbox may be used to toggle the value of a Boolean value such the CV field of the BYPASSx parameter of a voter function block. However, the value(s) written as a result of invoking a two-state checkbox during runtime can be any desired numeric data type.

As shown in FIG. 12, the example graphical interface 1200 includes a parameter path field 1202, a % P path field 1204, a check box properties area 1206, and confirm dialog information fields 1208 and 1210. An OK button 1212 is also included to enable a system user to complete the configuration of the toggle value dialog by, for example, selecting the OK button 1210.

Figure 13:
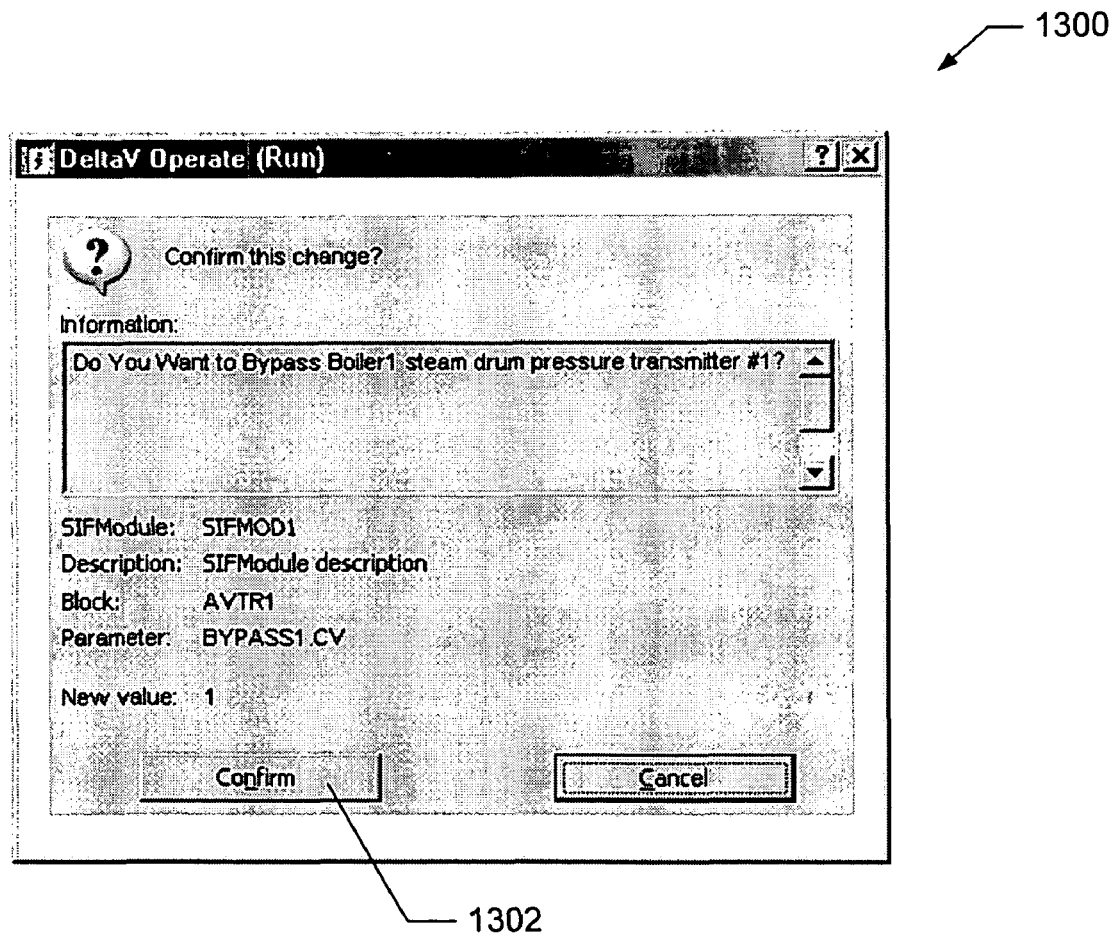

FIG. 13 is an example run-time dialog 1300 that may be presented to a system user in response to invoking an object or other graphic associated with a logic solver parameter that has been configured with the secure write stamper 104 using the toggle value interface 1200 of FIG. 12. The example dialog 1300 may, for example, be presented at block 704 (FIG. 7), a user may select a confirm button 1302 at block 706 (FIG. 7), and a secure command to cause toggling of a parameter in the logic solver 52 (FIG. 2) may be written or sent to the logic solver 52 at block 708.

Figure 14:
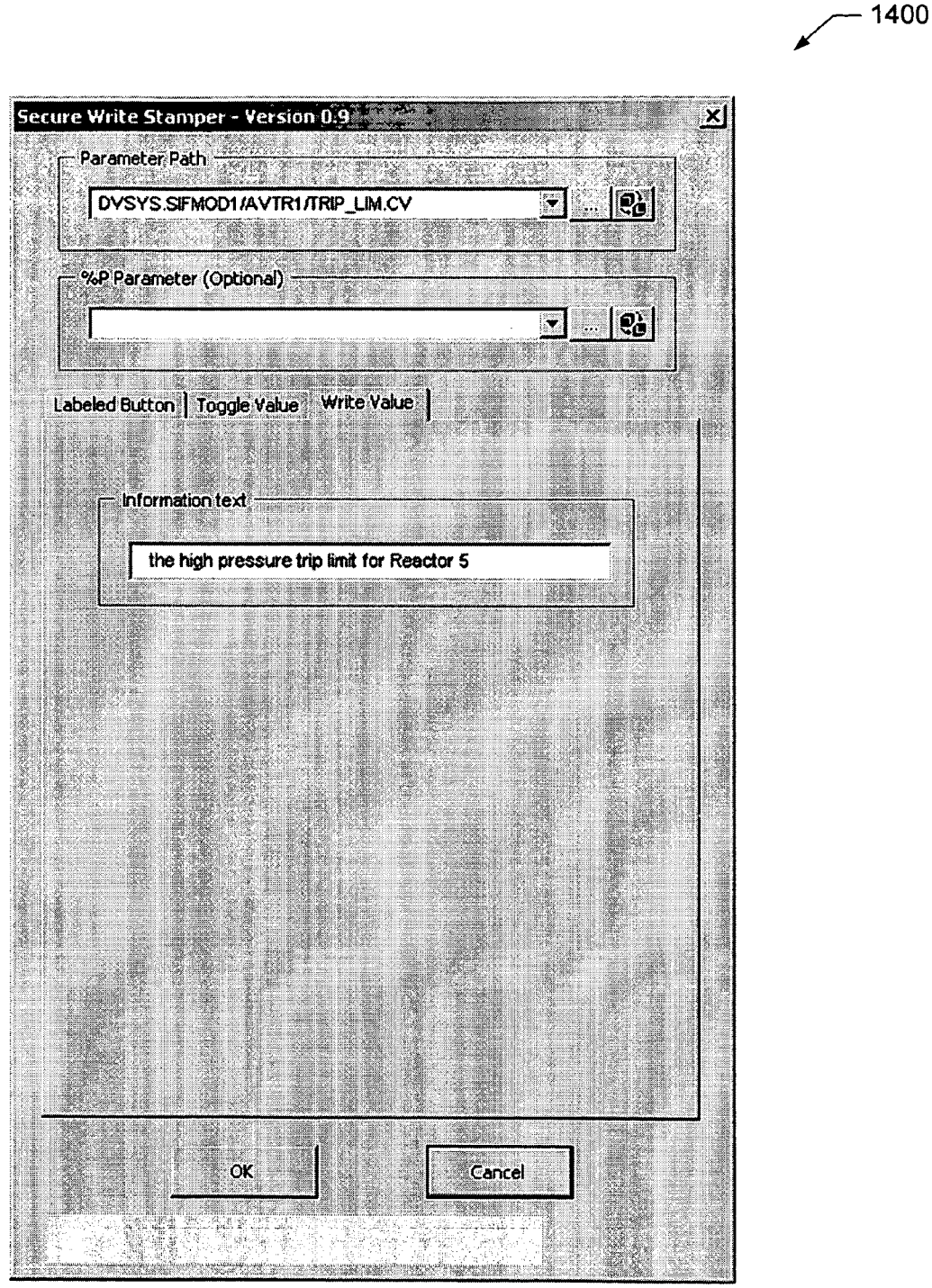

FIG. 14 depicts an example write value interface 1400 that may be presented to a system operator or other user in response to selection of a write value tab 1018 (FIG. 10) upon invocation of the secure write stamper 104. As depicted in the example dialog 1400 of FIG. 14, a system operator is prompted for parameter path information, option % P information, and information text to be displayed in connection with a run-time dialog that is used to write a value to a logic solver parameter.

Figure 15:
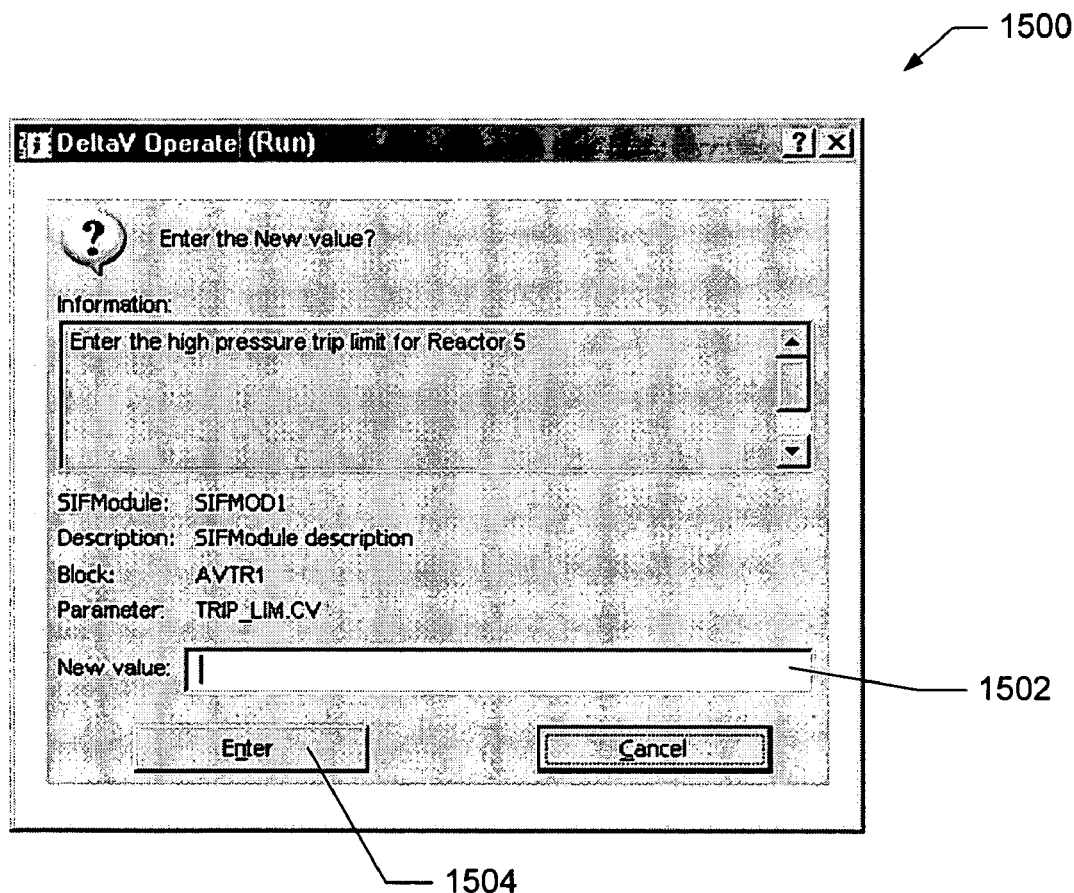
Figure 16:
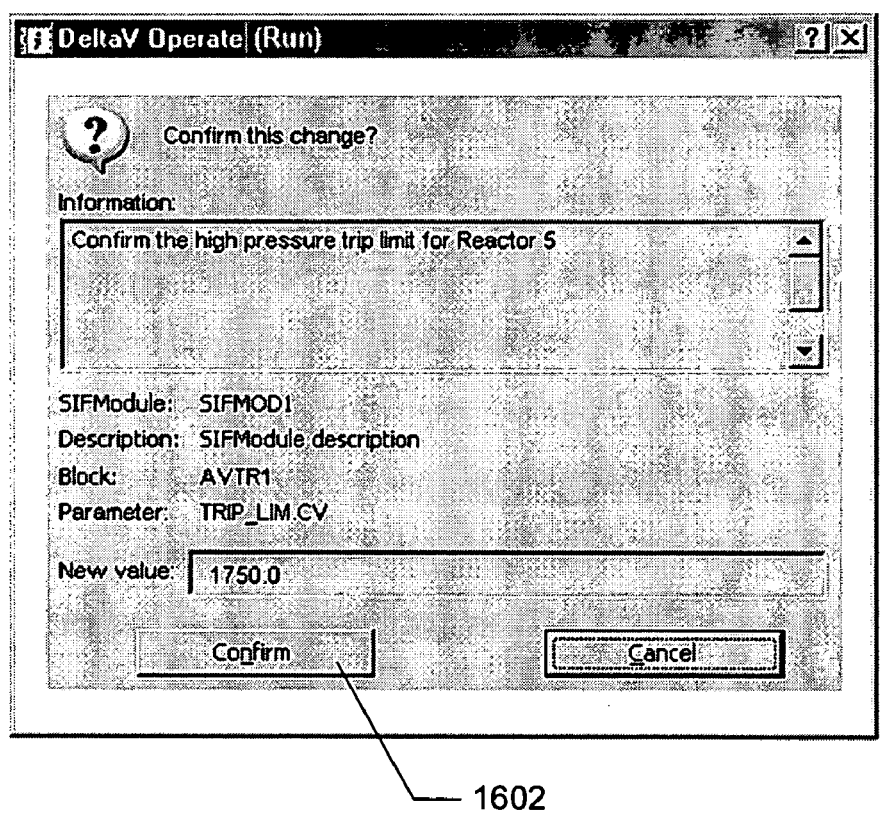

FIGS. 15 and 16 depict example run-time dialogs 1500 and 1600 that may be presented to a system operator or user to enable writing of a numeric value to a logic solver parameter using the secure data write methods disclosed herein. For example, the example graphical dialogs 1500 and 1600 may be presented to and interacted with by a user in connection with operation of the application station 20 as set forth in the example method 300 of FIG. 3. In particular, the example new value dialog 1500 may be presented at block 304 of FIG. 3. A user may enter a new parameter value into a field 1502 at block 306 (FIG. 3) and then select an Enter button 1504 at block 306.

The example new value confirm dialog 1600 may then be presented or generated at block 406 (FIG. 4A) and a confirm button 1602 is enabled at block 410 following acknowledgement of the secure data write request made at block 404. If the user selects the confirm button 1602 at block 412, the new value entered via the example dialog 1500 is sent a second time as a secure parameter confirm request to the controller at block 418.

The graphical interfaces and dialogs described in above in connection with FIGS. 10-16 are examples that may be used in connection with the example secure data write apparatus and methods described in connection with FIGS. 1-9. However, many other graphical interfaces and dialogs could be used instead of or in addition to the examples described above. For example, graphical dialogs enabling setting of a Boolean variable, a named set data type (e.g., in service, out of service, etc.), setting of a floating point variable type, setting an integer parameter value, etc. may be used instead of or in addition to those described above.

More generally, any desired graphical dialog may be employed to interoperate with appropriate scripts to perform the example secure write methods described herein. Further, such graphical dialogs and scripts may be used in connection with any desired configuration or run-time applications to perform one or more of the example secure data write methods described herein.

Although certain methods and apparatus and articles of manufacture have been described herein, the scope of coverage of this patent is not limited thereto. To the contrary, this patent covers all methods, apparatus and articles of manufacture fairly falling within the scope of the appended claims either literally or under the doctrine of equivalents.

What is claimed is:

1. A method of writing data in a process control system, comprising:
   receiving first data input via a first dialog, the first data to set a parameter associated with a process control element within the process control system;
   after sending the first data to the process control element, presenting the first data to a user via a confirmation dialog prompting for user input to confirm a request to write the first data to the process control element;
   receiving from the user the user input based on the presentation of the first data, the user input comprising a confirmation associated with the request to write the first data to the process control element;
   sending second data to the process control element in response to receiving the confirmation;
   comparing the first and second data at the process control element; and
   writing the first or second data to a location in the process control element associated with the parameter if the first data matches the second data.

2. A method as defined in claim 1, further comprising receiving a user selection of a graphical object via a graphical user interface, the graphical object being indicative of the parameter associated with the process control element.

3. A method as defined in claim 2, wherein the graphical object is associated with a function block, a function module, a device, equipment, or a parameter.

4. A method as defined in claim 1, wherein the parameter is associated with a safety instrumented function or a logic solver.

5. A method as defined in claim 1, further comprising receiving a user selection of the parameter via a run-time application, an operator station, an application station, or a controller.

6. A method as defined in claim 1, wherein sending the first data and the second data to the process control element includes sending the first and second data to the process control element via an application station and a controller.

7. A method as defined in claim 1, wherein sending the first data and the second data to the process control element includes sending redundant information to the process control element in response to the user input.

8. A method as defined in claim 1, wherein sending the first data associated with the process control element includes sending one of parameter value change information or command information.

9. A method as defined in claim 1, wherein sending the first data associated with the process control element includes sending an error checking value together with the first data.

10. A method as defined in claim 1, wherein sending the first data associated with the process control element includes receiving an input from the user via a graphical dialog and executing an underlying script.

11. A method as defined in claim 1, further comprising enabling a user interface confirmation button on the confirmation dialog in response to receiving an acknowledgement of receipt of the first data sent to the process control element.

12. A method as defined in claim 1, wherein comparing the first and second data at the process control element includes comparing at least one of error checking information, parameter path information, command information, or parameter value information.

13. A method as defined in claim 1, further comprising preventing the writing of the first or second data in response to a failure to receive the second data at the process control element in a predetermined time following receipt of the first data at the process control element.

14. A method as defined in claim 13, further comprising generation of an error message in response to the failure to receive the second data at the process control element in the predetermined time.

15. An apparatus for writing data in a process control system, comprising:
   one or more memories; and
   one or more processors coupled to the one or more memories and configured to:
      receive first data input via a first dialog, the first data to set a parameter associated with a process control element within the process control system;
      after the first data is sent to the process control element, present the first data to a user via a confirmation dialog prompting for user input to confirm a request to write the first data to the process control element;
      receive from the user the user input based on the presentation of the first data, the user input comprising a confirmation associated with the request to write the first data to the process control element;
      send second data to the process control element in response to receiving the confirmation;
      compare the first and second data at the process control element; and
      write the first or second data to a location in the process control element associated with the parameter if the first data matches the second data.

16. An apparatus as defined in claim 15, wherein the one or more processors are configured to receive a user selection of a graphical object via a graphical user interface, the graphical object being indicative of the parameter associated with the process control element.

17. An apparatus as defined in claim 16, wherein the graphical object is associated with a function block, a function module, a device, equipment, or a parameter.

18. An apparatus as defined in claim 15, wherein the parameter is associated with a safety instrumented function or a logic solver.

19. An apparatus as defined in claim 15, wherein the one or more processors are configured to receive a user selection of the parameter via a run-time application, an operator station, an application station, or a controller.

20. An apparatus as defined in claim 15, wherein the one or more processors are configured to send the first data and the second data to the process control element by sending the first and second data to the process control element via an application station and a controller.

21. An apparatus as defined in claim 15, wherein the one or more processors are configured to send the first data and the second data to the process control element by sending redundant information to the process control element in response to the user input.

22. An apparatus as defined in claim 15, wherein the one or more processors are configured to send the first data associated with the process control element by sending one of parameter value change information or command information.

23. An apparatus as defined in claim 15, wherein the one or more processors are configured to send the first data associated with the process control element by sending an error checking value together with the first data.

24. An apparatus as defined in claim 15, wherein the one or more processors are configured to send the first data associated with the process control element by receiving an input from the user via a graphical dialog and executing an underlying script.

25. An apparatus as defined in claim 15, wherein the one or more processors are configured to enable a user interface confirmation button on the confirmation dialog in response to receiving an acknowledgement of receipt of the first data sent to the process control element.

26. An apparatus as defined in claim 15, wherein the one or more processors are configured to compare the first and second data at the process control element by comparing at least one of error checking information, parameter path information, command information, or parameter value information.

27. An apparatus as defined in claim 15, wherein the one or more processors are configured to prevent the writing of the first or second data in response to a failure to receive the second data at the process control element in a predetermined time following receipt of the first data at the process control element.

28. An apparatus as defined in claim 27, wherein the one or more processors are configured to generate an error message in response to the failure to receive the second data at the process control element in the predetermined time.

29. A non-transitory machine accessible medium having instructions stored thereon that, when executed, cause a system to:
receive first data input via a first dialog, the first data to set a parameter associated with a process control element within a process control system;
after the first data associated with the parameter is sent to the process control element, present the first data to a user via a confirmation dialog prompting for user input to confirm a request to write the first data to the process control element;
receive from the user the user input based on the presentation of the first data, the user input comprising a confirmation associated with the request to write the first data to the process control element;
send second data to the process control element in response to receiving the confirmation;
compare the first and second data at the process control element; and
write the first or second data to a location in the process control element associated with the parameter if the first data matches the second data.

30. A machine accessible medium as defined in claim 29, wherein the instructions, when executed, cause the system to receive a user selection of a graphical object via a graphical user interface, the graphical object being indicative of the parameter associated with the process control element.

31. A machine accessible medium as defined in claim 30, wherein the graphical object is associated with a function block, a function module, a device, equipment, or a parameter.

32. A machine accessible medium as defined in claim 29, wherein the parameter is associated with a safety instrumented function or a logic solver.

33. A machine accessible medium as defined in claim 29, wherein the instructions, when executed, cause the system to receive a user selection of the parameter via a run-time application, an operator station, an application station, or a controller.

34. A machine accessible medium as defined in claim 29, wherein the instructions, when executed, cause the system to send the first data and the second data to the process control element by sending the first and second data to the process control element via an application station and a controller.

35. A machine accessible medium as defined in claim 29, wherein the instructions, when executed, cause the system to send the first data and the second data to the process control element by sending redundant information to the process control element in response to the user input.

36. A machine accessible medium as defined in claim 29, wherein the instructions, when executed, cause the system to send the first data associated with the process control element by sending one of parameter value change information or command information.

37. A machine accessible medium as defined in claim 29, wherein the instructions, when executed, cause the system to send the first data associated with the process control element by sending an error checking value together with the first data.

38. A machine accessible medium as defined in claim 29, wherein the instructions, when executed, cause the system to send the first data associated with the process control element by receiving an input from the user via a graphical dialog and executing an underlying script.

39. A machine accessible medium as defined in claim 29, wherein the instructions, when executed, cause the system to enable a user interface confirmation button on the confirmation dialog in response to receiving an acknowledgement of receipt of the first data sent to the process control element.

40. A machine accessible medium as defined in claim 29, wherein the instructions, when executed, cause the system to compare the first and second data at the process control element by comparing at least one of error checking information, parameter path information, command information, or parameter value information.

41. A machine accessible medium as defined in claim 29, wherein the instructions, when executed, cause the system to prevent the writing of the first or second data in response to a failure to receive the second data at the process control element in a predetermined time following receipt of the first data at the process control element.

42. A machine accessible medium as defined in claim 41, wherein the instructions, when executed, cause the system to generate an error message in response to the failure to receive the second data at the process control element in the predetermined time.

43. A secure write server, comprising:
a memory; and
a processor coupled to the memory and configured to:
- send data to be written and a secure write request to a controller in response to an application calling a secure write method;
- after sending the data to be written and the secure write request to the controller, present the data to be written to a user via a confirmation dialog prompting for user input to confirm the secure write request;
- receive a confirmation input from the user via the application based on the presentation of the data to be written, the confirmation input comprising a confirmation associated with the secure write request; and
- send a secure write confirm request to the controller in response to receiving the confirmation input.

44. The secure write server of claim 43, wherein the secure write request includes parameter value information or command information.

45. The secure write server of claim 43, wherein the secure write request is associated with at least one of a safety instrumented function, a function block, or a logic solver.

46. The secure write server of claim 43, wherein the secure write request and the secure write confirm request contain at least some identical information.

* * * * *